(12) United States Patent
Xu et al.

(10) Patent No.: US 12,541,286 B2
(45) Date of Patent: Feb. 3, 2026

(54) VIDEO PROCESSING METHOD, ELECTRONIC DEVICE, AND READABLE STORAGE MEDIUM

(71) Applicant: Honor Device Co., Ltd., Shenzhen (CN)

(72) Inventors: Jiajin Xu, Shenzhen (CN); Wenying Bao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 230 days.

(21) Appl. No.: 18/546,711

(22) PCT Filed: Dec. 21, 2022

(86) PCT No.: PCT/CN2022/140626
§ 371 (c)(1),
(2) Date: Aug. 16, 2023

(87) PCT Pub. No.: WO2023/160186
PCT Pub. Date: Aug. 31, 2023

(65) Prior Publication Data
US 2025/0004616 A1   Jan. 2, 2025

(30) Foreign Application Priority Data
Feb. 28, 2022  (CN) .......................... 202210191809.1

(51) Int. Cl.
*G06F 3/048*   (2013.01)
*G06F 3/04817*  (2022.01)
(Continued)

(52) U.S. Cl.
CPC ........ *G06F 3/0484* (2013.01); *G06F 3/04817* (2013.01); *G06F 3/0482* (2013.01);
(Continued)

(58) Field of Classification Search
CPC .. G06F 3/0484; G06F 16/735; G06F 3/04817; H04N 23/667; H04N 23/632
See application file for complete search history.

(56) References Cited

U.S. PATENT DOCUMENTS 10,216,312 B2 * 2/2019 Park ........................ H04N 23/45
10,645,294 B1 * 5/2020 Manzari ................. H04N 23/74
(Continued)

FOREIGN PATENT DOCUMENTS

CN   110401766 A   11/2019
CN   111061912 A   4/2020
(Continued)

*Primary Examiner* — Linh K Pham
(74) *Attorney, Agent, or Firm* — Conley Rose, P.C.

(57) ABSTRACT

A video processing method, an electronic device, and a computer-readable storage medium. The video processing method includes: displaying a first interface of a camera application, where the first interface of the camera application includes a first control; in response to a first operation on the first control, starting to record a first video; displaying a first interface of a gallery application after the recording of the first video is completed, where the first interface of the gallery application includes: a first thumbnail corresponding to the first video; and displaying a second interface of the gallery application in response to a third operation on the first thumbnail, where the second interface of the gallery application includes: the first thumbnail and a third thumbnail of a second image, and the second image is an image automatically acquired from the first video.

20 Claims, 20 Drawing Sheets

(51) Int. Cl.
  *G06F 3/0482*  (2013.01)
  *G06F 3/0484*  (2022.01)
  *G06F 16/735*  (2019.01)
  *H04N 5/76*    (2006.01)
  *H04N 23/63*   (2023.01)
  *H04N 23/667*  (2023.01)

(52) U.S. Cl.
  CPC ............ *G06F 16/735* (2019.01); *H04N 5/76* (2013.01); *H04N 23/632* (2023.01); *H04N 23/667* (2023.01)

(56) References Cited

U.S. PATENT DOCUMENTS

| | | | |
|---|---|---|---|
| 11,039,074 B1* | 6/2021 | Manzari | G06F 3/04847 |
| 2012/0105579 A1* | 5/2012 | Jeon | H04N 5/772 |
| | | | 348/47 |
| 2013/0104080 A1 | 4/2013 | Bosworth et al. | |
| 2013/0308032 A1 | 11/2013 | Terashima | |
| 2014/0204244 A1* | 7/2014 | Choi | H04N 23/64 |
| | | | 348/333.05 |
| 2015/0358666 A1* | 12/2015 | Atake | H04N 21/43615 |
| | | | 725/88 |
| 2016/0054895 A1* | 2/2016 | Lee | G06V 40/176 |
| | | | 715/716 |
| 2017/0011773 A1* | 1/2017 | Lee | H04N 5/9201 |
| 2017/0034449 A1* | 2/2017 | Eum | H04N 23/62 |
| 2017/0289462 A1* | 10/2017 | Eum | H04N 23/667 |
| 2018/0039387 A1* | 2/2018 | Cheong | G06F 1/1652 |
| 2018/0107360 A1* | 4/2018 | Kim | G06F 3/04817 |
| 2018/0241948 A1* | 8/2018 | Jang | G06F 3/04886 |
| 2019/0037173 A1* | 1/2019 | Lee | G06F 3/04842 |
| 2020/0280711 A1* | 9/2020 | Park | H04N 21/42204 |
| 2021/0382941 A1 | 12/2021 | Wu et al. | |
| 2022/0159183 A1* | 5/2022 | Li | H04N 23/635 |
| 2022/0294992 A1* | 9/2022 | Manzari | H04N 23/632 |
| 2022/0321795 A1* | 10/2022 | Jiang | H04N 23/531 |
| 2022/0394190 A1* | 12/2022 | Cui | H04N 23/635 |
| 2023/0185518 A1* | 6/2023 | Yang | H04N 5/77 |
| | | | 386/223 |

FOREIGN PATENT DOCUMENTS

| | | | | |
|---|---|---|---|---|
| CN | 113055585 A | | 6/2021 | |
| CN | 113810608 A | | 12/2021 | |
| EP | 3952285 A1 | * | 2/2022 | ............ H04N 23/62 |
| KR | 20170006559 A | * | 1/2017 | ........... H04N 23/635 |
| WO | WO-2020186969 A1 | * | 9/2020 | ............ H04N 23/45 |

\* cited by examiner

| _id | _data | _size | _dispaly_name | ai_video_group_id | wonder_photo_count |
|---|---|---|---|---|---|
| 1 | /storage/emulated/0/DCIM/Camera/VID_20220208_110034.MP4 | 23206188 | VID_20220208_110034.mp4 | c482878a24694856abcbec523837f6b9 | 0 |
| 2 | /storage/emulated/0/DCIM/Camera/VID_20220208_110038.MP4 | 30032228 | VID_20220208_110038.mp4 | dc8ad0bc56b94f3d8f0207aadbd004d6 | 0 |
| 3 | /storage/emulated/0/DCIM/Camera/VID_20220208_111121.MP4 | 22704991 | VID_20220208_111121.mp4 | 6c3a28ba299445ce937059311aaadd8c6 | 1 |
| 4 | /storage/emulated/0/DCIM/Camera/magicmoment/IMG_20220208_111114.jpg | 6143341 | VID_20220208_111114.mp4 | 6c3a28ba299445ce937059311aaadd8c6 | 0 |
| 5 | /storage/emulated/0/DCIM/Camera/VID_20220208_111158.MP4 | 33117345 | VID_20220208_111158.mp4 | 6d5461af6cdf4a0d9f35130b6020e4d8 | 0 |
| 6 | /storage/emulated/0/DCIM/Camera/VID_20220208_111446.MP4 | 23675218 | VID_20220208_111446.mp4 | 7641f717ce73465ca3609cccab68bd0b | 0 |
| 7 | /storage/emulated/0/DCIM/Camera/VID_20220208_111642.MP4 | 46520050 | VID_20220208_111642.mp4 | 71a301ab3fb54f2a9a4f54c74c646888 | 1 |
| 8 | /storage/emulated/0/DCIM/Camera/magicmoment/IMG_20220208_111638.jpg | 6224588 | VID_20220208_111638.mp4 | 71a301ab3fb54f2a9a4f54c74c646888 | 0 |
| 9 | /storage/emulated/0/Pictures/Screenshots/SVID_20220208_111704_1.mp4 | 16086402 | VID_20220208_111704.mp4 | (null) | 0 |

FIG. 6

VIDEO PROCESSING METHOD, ELECTRONIC DEVICE, AND READABLE STORAGE MEDIUM

CROSS-REFERENCE TO RELATED APPLICATIONS

This is a U.S. National Stage of International Application No. PCT/CN2022/140626 filed on Dec. 21, 2022, which claims priority to Chinese Patent Application No. 202210191809.1, filed with the China National Intellectual Property Administration on Feb. 28, 2022, both of which are incorporated herein by reference in their entireties.

TECHNICAL FIELD

This application relates to the field of intelligent terminal technologies, and specifically, to a video processing method, an electronic device, and a readable storage medium.

BACKGROUND

Nowadays, with the continuous development of intelligent terminal technologies, a growing number of users like to use the camera function in mobile phones to take pictures and videos, so as to record details of life. However, at present, the functions provided by the mobile phones still cannot satisfy the requirements of the users for interestingness.

SUMMARY

This application provides a video processing method, an electronic device, and a readable storage medium, which can improve the degree of convenience for users to view videos and images associated with the videos.

According to a first aspect, a video processing method is provided, including: displaying a first interface of a camera application, where the first interface of the camera application includes: a first preview image and a first control; in response to a first operation on the first control, starting, by an electronic device, to record a first video and displaying a second interface of the camera application, where the second interface of the camera application includes: a second preview image and a second control; obtaining, by the electronic device, a first image in response to a second operation on the second control during recording of the first video; displaying a first interface of a gallery application after the recording of the first video is completed, where the first interface of the gallery application includes: a first thumbnail corresponding to the first video and a second thumbnail corresponding to the first image; and displaying a second interface of the gallery application in response to a third operation on the first thumbnail, where the second interface of the gallery application includes: the first thumbnail and a third thumbnail of a second image, and the second image is an image automatically acquired from the first video.

In the foregoing embodiment of this application, in a case that the electronic device enables a "one record for multiple gains" function, the electronic device automatically generates an image associated with a video obtained through recording, and the image can be used as a wonderful photo of the video. On an album display interface of the gallery application, thumbnails of manually recorded videos and manually photographed images are displayed, and after the electronic device detects a selection operation on a video, an image associated with the video is displayed. In such a display manner, the image associated with the video is prevented from interfering with the display interface of the gallery, and an association between the video and the image associated with the video can be displayed, thereby achieving the objective of being convenient for users to view.

In a possible implementation, the second interface of the gallery application further includes the first video.

In a possible implementation, in response to the third operation on the first thumbnail, the first video is played silently on the second interface of the gallery application, the second interface of the gallery application further includes: a progress bar, a third control, and a fourth control, and the method further includes: pausing, in response to a fourth operation on the third control, playing the first video; playing sound of the first video in response to a fifth operation on the fourth control; and adjusting a playback progress of the first video in response to a sixth operation on the progress bar.

In a possible implementation, after the displaying a second interface of the gallery application in response to a third operation on the first thumbnail, the method further includes: displaying a third interface of the gallery application in response to a seventh operation on the third thumbnail, where the third interface of the gallery application includes: the first thumbnail, the second image, and the third thumbnail.

In a possible implementation, on the second interface of the gallery application, the first thumbnail is larger than the third thumbnail; and on a third interface of the gallery application, the third thumbnail is larger than the first thumbnail.

In a possible implementation, the method further includes: displaying a fourth interface of the gallery application, where the fourth interface of the gallery application includes: a first folder; displaying a fifth interface of the gallery application in response to an eighth operation on the first folder, where the fifth interface of the gallery application includes the third thumbnail; and displaying a sixth interface of the gallery application in response to a ninth operation on the third thumbnail, where after the recording of the first video is completed, the sixth interface of the gallery application automatically includes the second image.

In a possible implementation, the sixth interface of the gallery application further includes: the first thumbnail and the third thumbnail.

In a possible implementation, the fourth interface of the gallery application further includes a second folder, and the method further includes: displaying a seventh interface of the gallery application in response to a tenth operation on the second folder, where after the recording of the first video is completed, the seventh interface automatically includes the second thumbnail.

In a possible implementation, the second interface of the camera application further includes a fifth control, and after the in response to a first operation on the first control, starting, by an electronic device, to record a first video and displaying a second interface of the camera application, the method further includes: ending, by the electronic device in response to an eleventh operation on the fifth control, recording the first video and displaying the first interface of the camera application, where the first interface of the camera application further includes a sixth control; and displaying the second interface of the gallery application in response to a twelfth operation on the sixth control.

In a possible implementation, before the in response to a first operation on the first control, starting, by an electronic device, to record a first video and displaying a second interface of the camera application, the method further includes: acquiring the second image during recording of the first video in a case that the electronic device photographs the first video in a first photographing mode; and skipping, in a case that the electronic device photographs a second video in a second photographing mode, automatically acquiring an image from the second video during recording of the second video.

In a possible implementation, before the displaying a second interface of the gallery application in response to a third operation on the first thumbnail, the method further includes: parsing the first video corresponding to the first thumbnail, to obtain a group identifier corresponding to the first video; and searching for an image having a same group identifier as the first video, and determining that a found image is the second image.

In a possible implementation, file header information of the first video includes tag information, and the tag information includes a group identifier of the first video; and an image file of the second image includes a group identifier of the second image, and the group identifier of the second image is the same as the group identifier of the first video.

In a possible implementation, a database includes a first field, and the first field includes the group identifier of the first video and the group identifier of the second image.

In a possible implementation, the database includes a second field, and the second field corresponding to the first video is used for describing a quantity of images having a same group identifier as the first video.

In a possible implementation, file header information of the first video includes a first identifier, an image file of a third image includes a second identifier, the first identifier is associated with the second identifier, and the second interface of the gallery application further includes a fourth thumbnail of the third image.

In a possible implementation, the first identifier is the same as the second identifier.

According to a second aspect, this application provides an electronic device, including: one or more processors, a memory, a camera, and a display screen; where the memory, the camera, and the display screen are coupled to the one or more processors, the memory is configured to store computer program code, the computer program code includes computer instructions, and when the one or more processors execute the computer instructions, the electronic device performs the video processing method according to any one of the implementations of the first aspect.

According to a third aspect, this application provides a computer-readable storage medium, configured to store a computer program, where when the computer program is executed by an electronic device, the electronic device is enabled to implement the video processing method according to any one of the implementations of the first aspect.

According to a fourth aspect, this application provides a computer program product, where when the computer program product runs on a computer, the computer is enabled to perform the video processing method according to any one of the implementations of the first aspect.

BRIEF DESCRIPTION OF DRAWINGS

FIG. 6 is a schematic diagram of storing one-record-for-multiple-gains videos and wonderful photos in an ML in association with each other according to an embodiment of this application;

DESCRIPTION OF EMBODIMENTS

Technical solutions in embodiments of this application are described below with reference to the accompanying drawings in the embodiments of this application. In the descriptions of embodiments of this application, unless otherwise specified, "/" represents "or". For example, A/B may represent A or B. In this specification, "and/or" is merely an association relationship for describing associated objects, and indicates that three relationships may exist. For example, A and/or B may indicate the following three cases: Only A exists, both A and B exist, and only B exists. In addition, in the description of the embodiments of this application, "multiple" refers to two or more than two.

The terms "first", "second", and "third" are used herein for description only, and cannot be understood as indicating or implying relative importance or implicitly indicating the quantity of indicated technical features. Therefore, a feature defined by "first", "second", or "third" may explicitly or implicitly include one or more such features.

The video processing method provided in this embodiment of this application may be applied to terminal devices such as a mobile phone, a tablet computer, a wearable device, a vehicle-mounted device, an augmented reality (augmented reality, AR)/virtual reality (virtual reality, VR)

device, a notebook computer, an ultra-mobile personal computer (ultra-mobile personal computer, UMPC), a netbook, and a personal digital assistant (personal digital assistant, PDA). Specific types of terminal device are not limited in this embodiment of this application.

Figure 1:
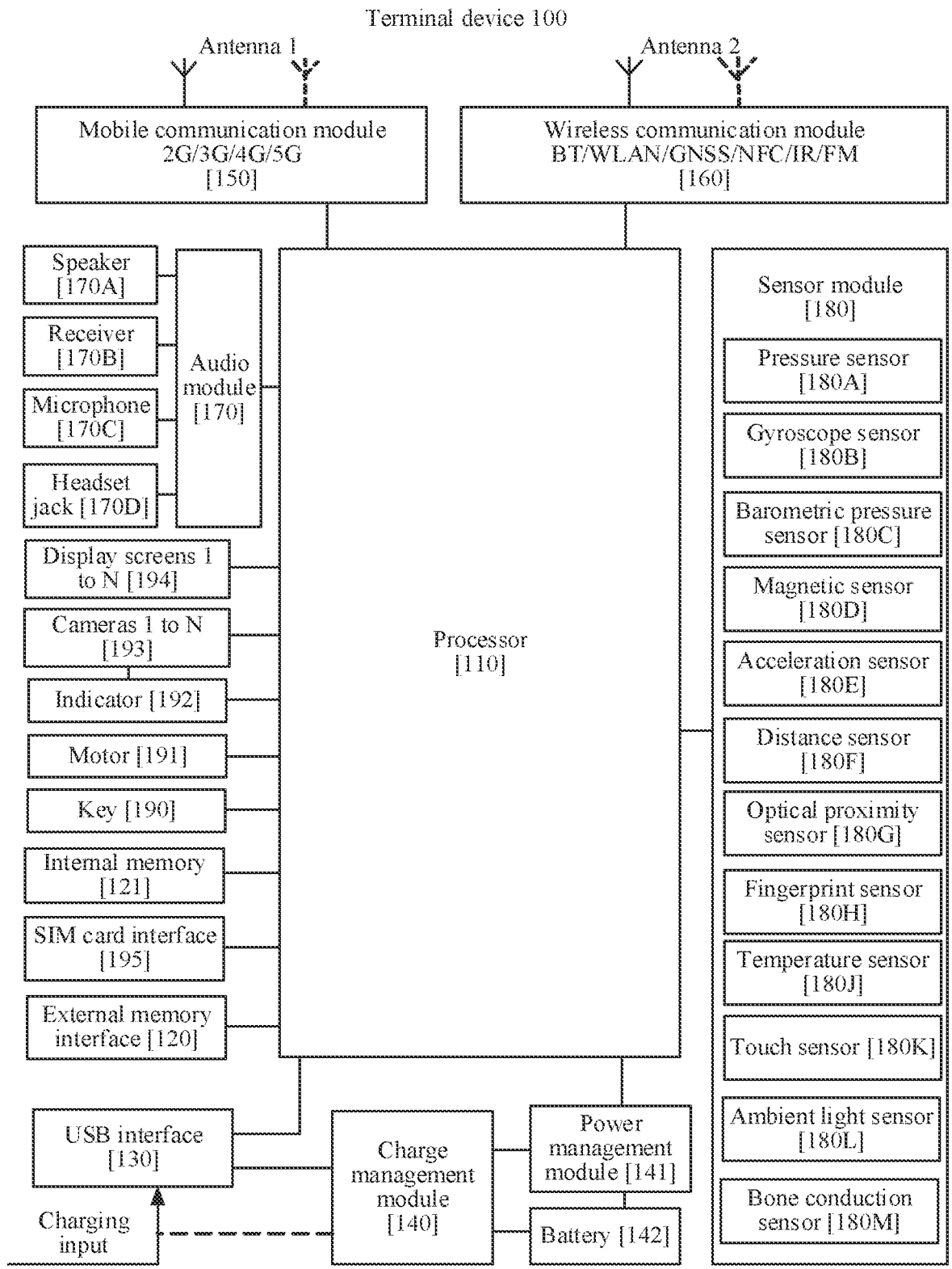
FIG. 1 is a schematic structural diagram of a terminal device 100 according to an embodiment of this application.

For example, FIG. 1 is a schematic structural diagram of a terminal device 100 according to an embodiment of this application. The terminal device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, an engine 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that, a structure shown in this embodiment of this application does not constitute a specific limitation on the terminal device 100. In some other embodiments of this application, the terminal device 100 may include more or fewer components than those shown in the figure, or some components may be combined, or some components may be split, or components may be arranged in different manners. The components in the portrait may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices, or may be integrated into one or more processors.

The controller may be a nerve center and a command center of the terminal device 100. The controller may generate an operation control signal according to instruction operation code and a time-sequence signal, and control obtaining and executing of instructions.

A memory may also be disposed in the processor 110, configured to store instructions and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments, the processor 110 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, a universal serial bus (universal serial bus, USB) interface, and/or the like.

It may be understood that, the interface connection relationship between the modules illustrated in the embodiments of this application is merely an example for description, and does not constitute a limitation on the structure of the terminal device 100. In some other embodiments of this application, the terminal device 100 may alternatively adopt an interface connection mode different from the foregoing embodiment, or a combination of multiple interface connection modes.

In some embodiments, the antenna 1 of the terminal device 100 is coupled to the mobile communication module 150, and the antenna 2 is coupled to the wireless communication module 160, so that the terminal device 100 can communicate with a network and another device by using a wireless communication technology. The wireless communication technology may specifically include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system. QZSS), and/or a satellite based augmentation system (satellite based augmentation systems, SBAS).

The terminal device 100 implements a display function through the GPU, the display screen 194, an application processor, or the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a Micro LED, a Micro-OLED, quantum dot light emitting diodes (quantum dot light emitting diodes, QLED), and the like. In some embodiments, the terminal device 100 may include one or N display screens 194, and N is a positive integer greater than 1.

The terminal device 100 may implement a photographing function by using the ISP, the camera 193, the video codec, the GPU, the display screen 194, the application processor, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may alternatively perform algorithm optimization on noise, luminance, and complexion of the image. The ISP may further optimize parameters such as exposure and a color temperature of a photographing scene. In some embodiments, the ISP may be arranged in the camera 193.

The terminal device 100 can implement an audio function, for example, music playback and recording, by using the audio module 170, the speaker 170A, the receiver 170B, the microphone 170C, the headset jack 170D, the application processor, and the like. The audio function is, for example, music playback and sound recording.

The audio module 170 is configured to convert digital audio information into analog audio signal output, and is also configured to convert analog audio input into a digital audio signal. The audio module 170 may further be configured to encode and decode audio signals. In some embodiments, the audio module 170 may be disposed in the processor 110, or some functional modules of the audio module 170 are disposed in the processor 110.

The SIM card interface 195 is configured to connect to a SIM card. The SIM card may be inserted into the SIM card interface 195 or plugged from the SIM card interface 195, to come into contact with or be separated from the terminal device 100. The terminal device 100 may support 1 or N SIM card interfaces. N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be the same as or different from each other. The SIM card interface 195 may be compatible with different types of SIM cards. The SIM card interface 195 may also be compatible with an external storage card. The terminal device 100 interacts with a network by using a SIM card, to implement functions such as a call and data communication. In some embodiments, the terminal device 100 uses an eSIM, that is, an embedded SIM card. The eSIM card may be embedded in the terminal device 100 and cannot be separated from the terminal device 100.

A software system of the terminal device 100 may use a layered architecture, an event-driven architecture, a micro-kernel architecture, a micro-service architecture, or a cloud architecture. In embodiments of this application, an Android system of the layered architecture is used as an example to illustrate the software structure of the terminal device 100.

Figure 2:
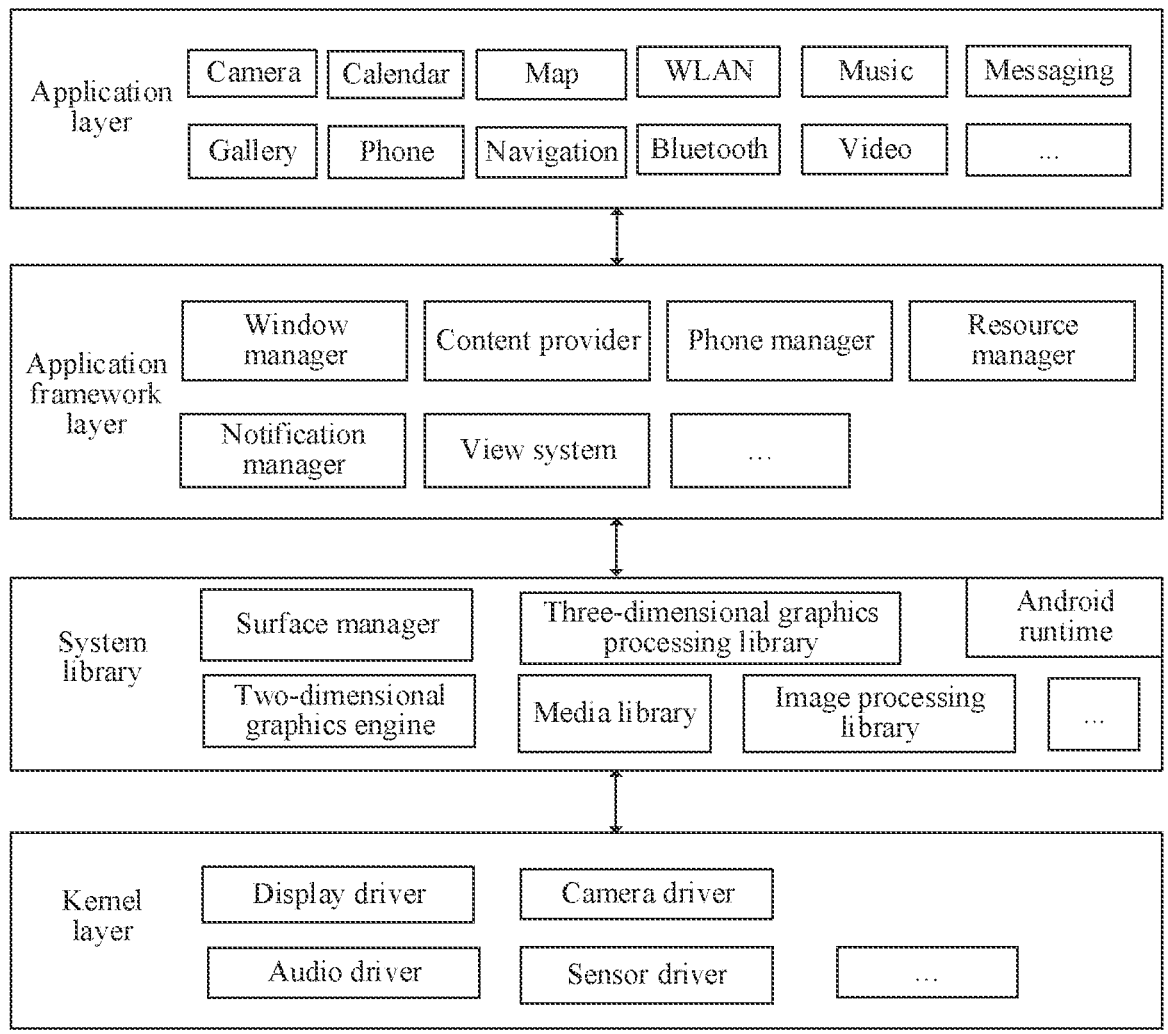
FIG. 2 is a block diagram of a software structure of a terminal device 100 according to an embodiment of this application.

FIG. 2 is a block diagram of a software structure of a terminal device 100 according to an embodiment of this application. In the layered architecture, the software is divided into several layers, and each layer has a clear role and task. The layers communicate with each other by using a software interface. In some embodiments, the Android system is divided into four layers that are respectively an application layer, an application framework layer, an Android runtime (Android runtime) and system library, and a kernel layer from top to bottom. The application layer may include a series of application packages.

As shown in FIG. 2, the application packages may include applications such as camera, gallery, calendar, phone, map, navigation, WLAN, Bluetooth, music, video, and messaging.

The application framework layer provides an application programming interface (application programming interface, API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window application. The window manager may acquire a size of a display screen, determine whether there is a status bar, lock a screen, capture a screen, and the like.

The content provider is configured to store and acquire data and make the data accessible to an application. The data may include a video, an image, an audio, calls made and answered, a browsing history and bookmarks, an address book, and the like.

The view system includes a visual control such as a control for text display or a control for picture display. The view system may be configured to construct an application. A display interface may include one or more views. For example, a display interface including an SMS notification icon may include a view for displaying text and a view for displaying a picture.

The phone manager is configured to provide communication functions of the terminal device 100, for example, call state management (including getting through, hang-up, and the like).

The resource manager provides various resources such as a localized character string, an icon, a picture, a layout file, and a video file for an application.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted in the status bar, a prompt tone is made, the terminal device vibrates, and an indicator lamp flashes.

Android runtime includes a core library and a virtual machine. Android runtime is responsible for scheduling and management of the Android system.

The core library includes two parts: one part is a performance function that the Java language needs to invoke, and the other part is a core library of Android.

The application layer and the application framework layer are run in the virtual machine. The virtual machine executes java files of the application layer and the application framework layer as binary files. The virtual machine is configured to execute functions such as object lifecycle management, stack management, thread management, security and exception management, and garbage collection.

The system library may include a plurality of function modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG4, H.264, MP3, AAC, AMR, JPG, PNG, and the like.

The three-dimensional graphics processing library is configured to implement three-dimensional graphics drawing, image rendering, synthesis, layer processing, and the like.

The 2D graphics engine is a drawing engine for 2D graphics.

The kernel layer is a layer between hardware and software. The kernel layer includes at least a display driver, a camera driver, an audio driver, and a sensor driver.

When a user uses a camera function in a mobile phone to photograph a video, the user may also intend to obtain some images associated with the video, such as wonderful pictures in the video. In the process of photographing the video by the user, or after the user photographs the video, wonderful pictures can be extracted from the video, so as to obtain images related to the video. In order to make it convenient for the user to view and obtain better display effects, in the embodiments of this application, a video and images associated with the video are associated during storage, so that when the user plays the video, the video and the images associated with the video can be associatively displayed, thereby achieving the effect of being convenient for the user to view.

Figure 3A:
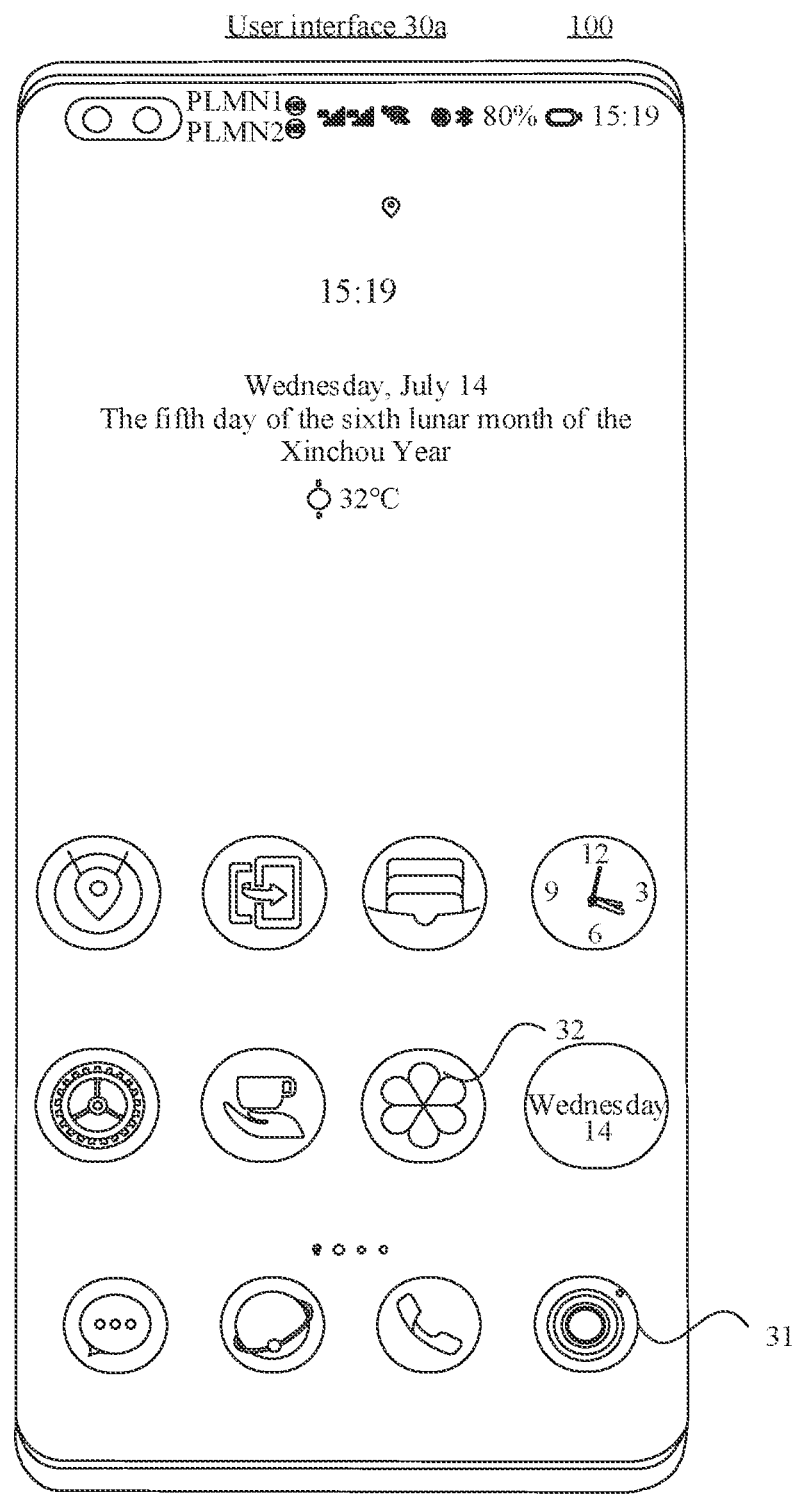
FIG. 3a is a schematic diagram of a first graphical user interface according to an embodiment of this application.
Figure 3B:
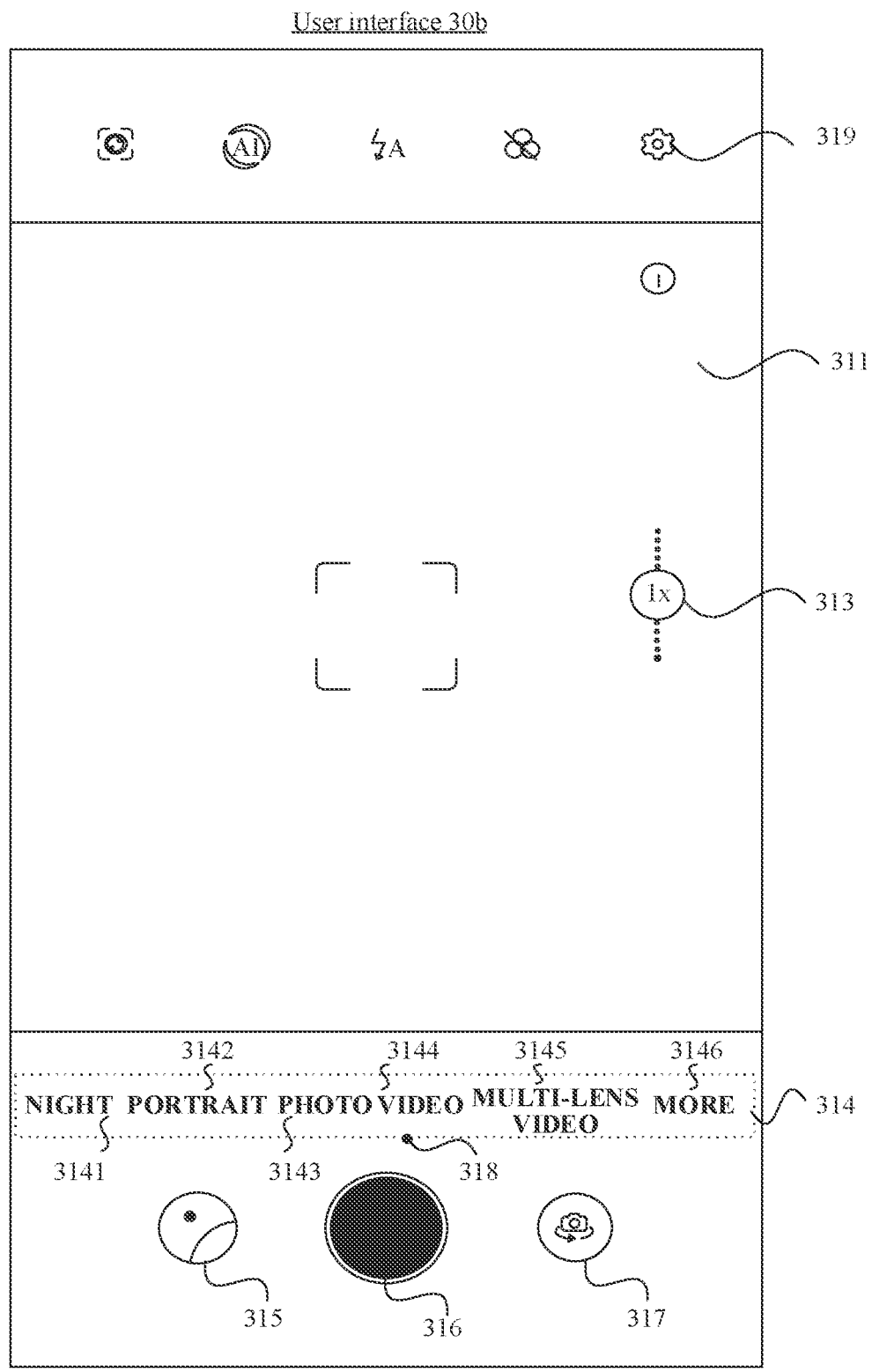
FIG. 3b is a schematic diagram of a second graphical user interface according to an embodiment of this application.
Figure 3C:
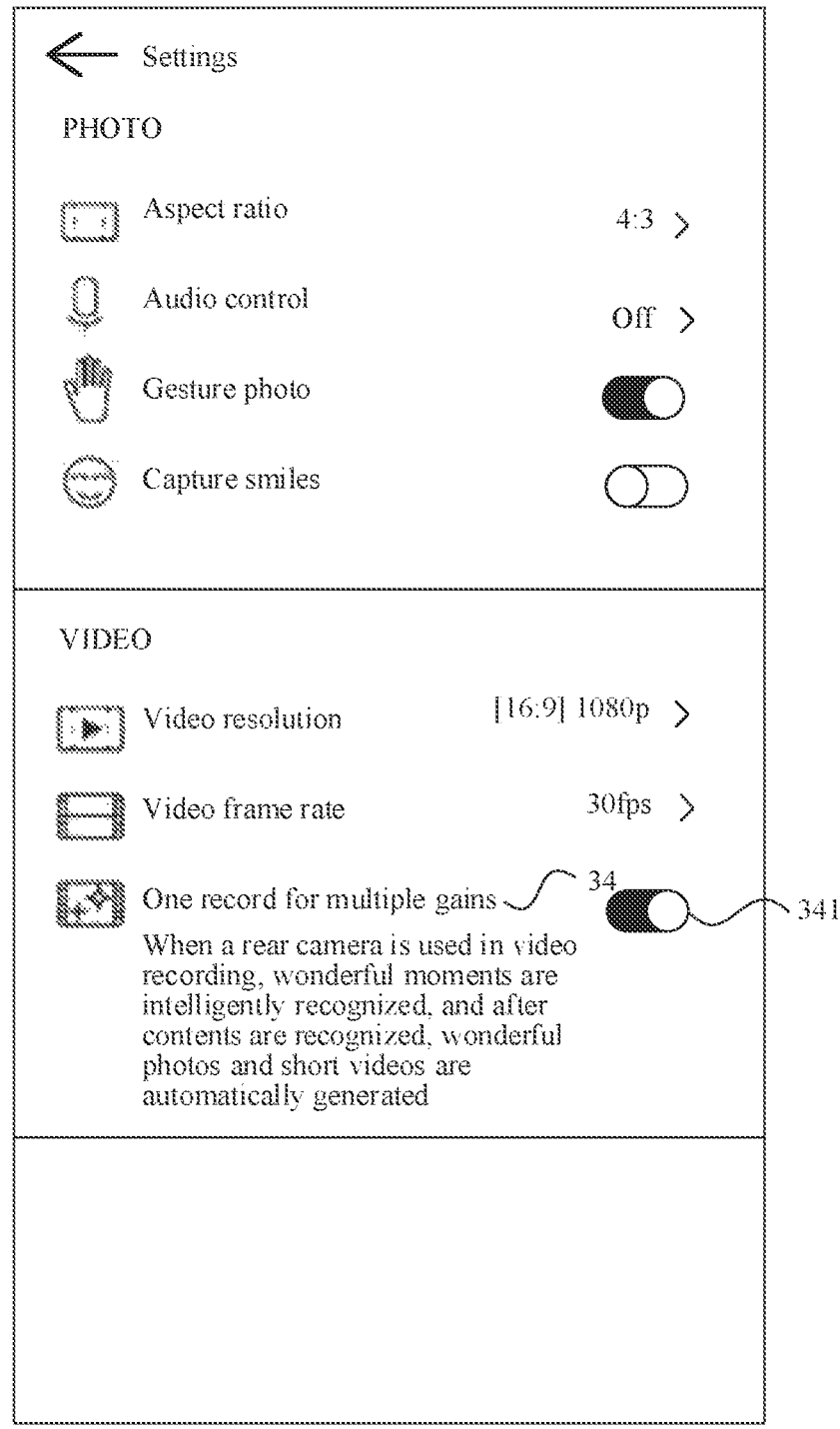
FIG. 3c is a schematic diagram of a third graphical user interface according to an embodiment of this application.

An application scenario of the video processing method provided in the embodiments of this application is described first with reference to FIG. 3a to FIG. 3c. FIG. 3a to FIG. 3c are schematic diagrams of enabling a one-record-for-multiple-gains function according to an embodiment of this application.

As shown in FIG. 3a, a user interface 30a is a main interface of an electronic device 100, and the main interface includes a camera icon 31, and other function icons. When detecting a click/tap operation on the camera icon 31, the electronic device 100 displays a user interface 30b shown in FIG. 3b in response to the operation.

The user interface 30b is a photographing interface of the electronic device 100, and the user interface 30b includes a preview region 311, a zoom ratio adjustment control 313, a function region 314, a gallery control 315, a virtual shutter control 316, an echo control 317, and a function indication icon 318, and a setting control 319. The preview region 311 is configured for displaying a real-time preview image photographed by the camera. The zoom ratio adjustment control 313 is configured to adjust a zoom multiple of the preview image at the preview region 311, where 1× is a zoom multiple of 1, 2× is a zoom multiple of 2, 3× is a zoom multiple of 3, . . . , and the rest is deduced by analogy. The zoom multiple is positively correlated with a focal length of the image. A larger zoom multiple indicates a larger focal length of the image, and indicates a larger photographed object in the photographed image. It can be seen from FIG. 3b that the zoom multiple of the current preview image is 1. The echo control 317 is configured to switch a front-facing camera and a rear-facing camera of the electronic device 100. When the current working camera of the electronic device 100 is the rear-facing camera, a single-click/tap operation on the echo control 317 by the user is detected, and in response to the operation, the electronic device 100 switches the working camera to the front-facing camera. In this case, at the preview region 311, a preview image obtained by the front-facing camera is displayed, and the preview image obtained by the rear-facing camera is not displayed. When the current working camera of the electronic device 100 is the front-facing camera, a single click/tap operation on the echo control 317 by the user is detected, and in response to the operation, the electronic device 100 switches the working camera to the rear-facing camera. In this case, at the preview region 311, the preview image obtained by the rear-facing camera is displayed, and the preview image obtained by the front-facing camera is not displayed. After the electronic device 100 detects an input operation on the gallery control 315, the electronic device 100 displays a gallery interface, so that the user can browse videos or images stored in the electronic device 100. The function region 314 includes function modes currently supported by the camera application, and the function region 314 includes a "NIGHT" control 3141, a "PORTRAIT" control 3142, a "PHOTO" control 3143, a "VIDEO" control 3144, a "MULTI-LENS VIDEO" control 3145, a "MORE" control 3146, and a function indication icon 318. The function indication icon 318 is used for indicating the current photographing mode of the electronic device. As shown in FIG. 3b, the function indication icon 318 is below the "VIDEO" control 3144, and the current photographing mode of the electronic device 100 is a video recording mode. The zoom ratio adjustment control 313 is used for adjusting a zoom ratio of a preview image. When the electronic device 100 detects an input operation (for example, sliding up) on the zoom ratio adjustment control 313, the electronic device may increase the zoom ratio of the preview image in response to the input operation.

The electronic device detects a click/tap operation on the setting control 319 on the user interface 30b, and the electronic device 100 displays a user interface 30c shown in FIG. 3c in response to the operation. The user interface 30c includes various control items for photographing parameters and photographing functions, among which there is a one-record-for-multiple-gains control item 34. The user performs an operation on a switch 341 of the one-record-for-multiple-gains control item 34 to change the enabled/disabled state of the one-record-for-multiple-gains function. On the user interface 30c, the one-record-for-multiple-gains function of the electronic device 100 is disabled, and the user performs an operation on the switch 341 of the one-record-for-multiple-gains control item 34, then the one-record-for-multiple-gains function of the electronic device 100 can be enabled.

The one-record-for-multiple-gains function may be a photographing function that: in the process of photographing a video by the electronic device, one or more frames of images are extracted from the video photographed by the electronic device in real time as images associated with the video, so that after the electronic device photographs the video, the video and the images associated with the video can be simultaneously obtained. The one or more frames of images extracted from the video are determined by the electronic device according to a preset algorithm, and the extracted one or more frames of images may be top N images selected according to scoring results after each frame of image in the video is scored according to a preset algorithm, and the selected top N images may be used as wonderful photos of the video, that is, images associated with the video.

It should be understood that FIG. 3a to FIG. 3c are only exemplary descriptions of enabling the "one record for multiple gains" function by the electronic device 100, and should not limit the protection scope of the embodiments of this application. The manner of enabling the "one record for multiple gains" function by the electronic device 100 is not limited in the embodiments of this application.

Figure 3D:
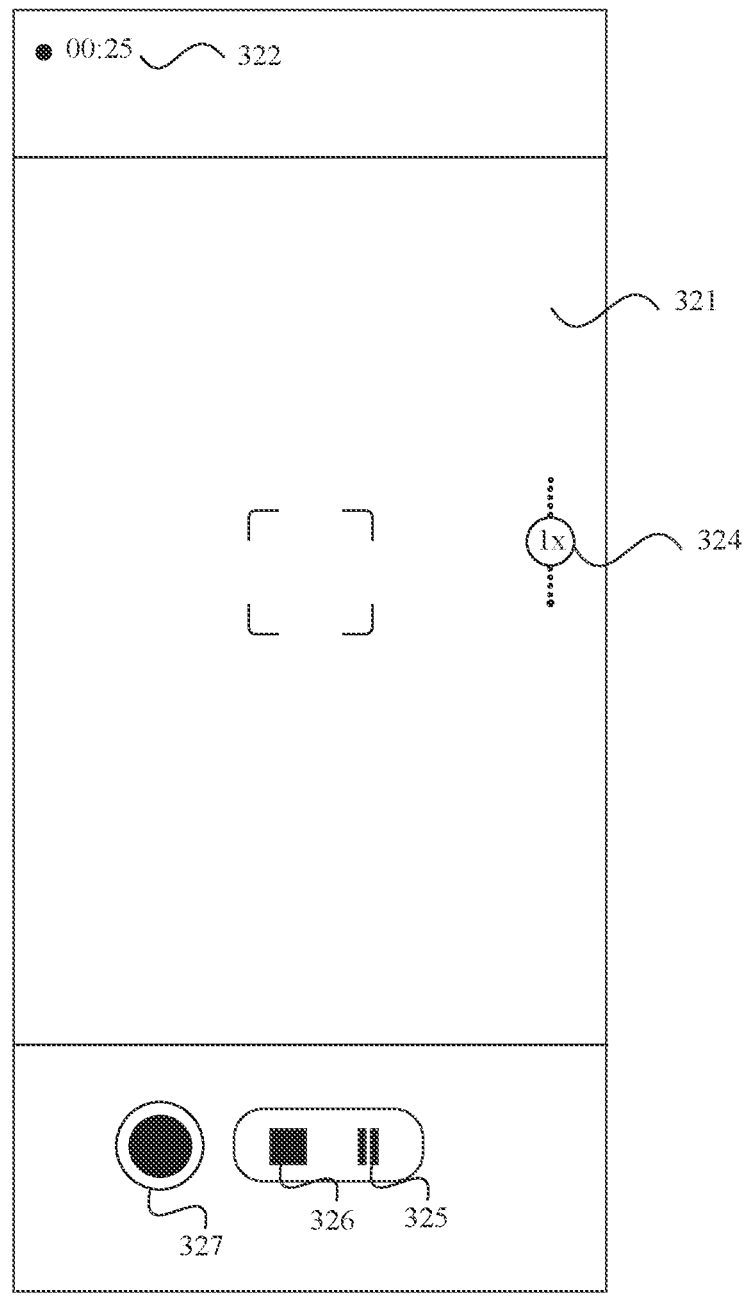
FIG. 3d is a schematic diagram of a fourth graphical user interface according to an embodiment of this application.

The electronic device 100 detects a click/tap operation on the virtual shutter control 316 on the user interface 30*b*, and in response to the operation, the electronic device 100 displays a user interface 30*d* shown in FIG. 3*d*, and starts to record a video. The user interface 30*d* is a video recording interface of the electronic device 100. The video recording interface includes a photographing preview region 321, a recording time 322, a zoom ratio adjustment control 324, a recording pause control 325, recording stop control 326, and a photo taking control 327. The photographing preview region 321 is configured for displaying a currently photographed preview image in real time, and the recording time 322 is used for indicating a photographing duration of a current video. On the user interface 30*d*, the recording time of the current video is 25 s. The zoom ratio adjustment control 324 displays a zoom ratio of the current preview picture, and the current zoom ratio is 1. For the relevant description of the zoom ratio adjustment control 324, reference may be made to the related description of the zoom ratio adjustment control 313 in FIG. 3*b*, and details are not described herein again. The recording pause control 325 is configured for the user to pause the current video recording in FIG. 4*a*. After the electronic device 100 detects a click/tap operation on the recording pause control 325, the electronic device 100 pauses recording the video in response to the operation. The recording stop control 326 is configured for the user to stop recording the video. As shown in FIG. 3*d*, when the electronic device 100 detects a single click/tap operation on the recording stop control 326, the electronic device 100 stops recording the video in response to the operation, to obtain a video B, and saves the video and images B2, B3, and B4 associated with the video. The photo taking control 327 is configured to take a picture during video recording. When the electronic device 100 detects a single click/tap operation on the photo taking control 327, the electronic device 100 takes a picture in response to the operation, to obtain an image B1.

FIG. 3*a* to FIG. 3*c* illustrate that the electronic device 100 enables the "one record for multiple gains" function, and FIG. 3*d* illustrates that the electronic device 100 records a video. The following describes playback of a one-record-for-multiple-gains video with reference to FIG. 4*a* to FIG. 4*e*. The one-record-for-multiple-gains video is a video photographed by the electronic device 100 when the one-record-for-multiple-gains function is enabled.

As shown in FIG. 3*a*, the user interface 30*a* is a main interface of the electronic device 100, and the main interface includes a gallery icon 32 and other application icons. When the electronic device 100 detects a click/tap operation on the gallery icon 32, the electronic device 100 displays a user interface 40*a* shown in FIG. 4*a* in response to the operation.

Figure 4A:
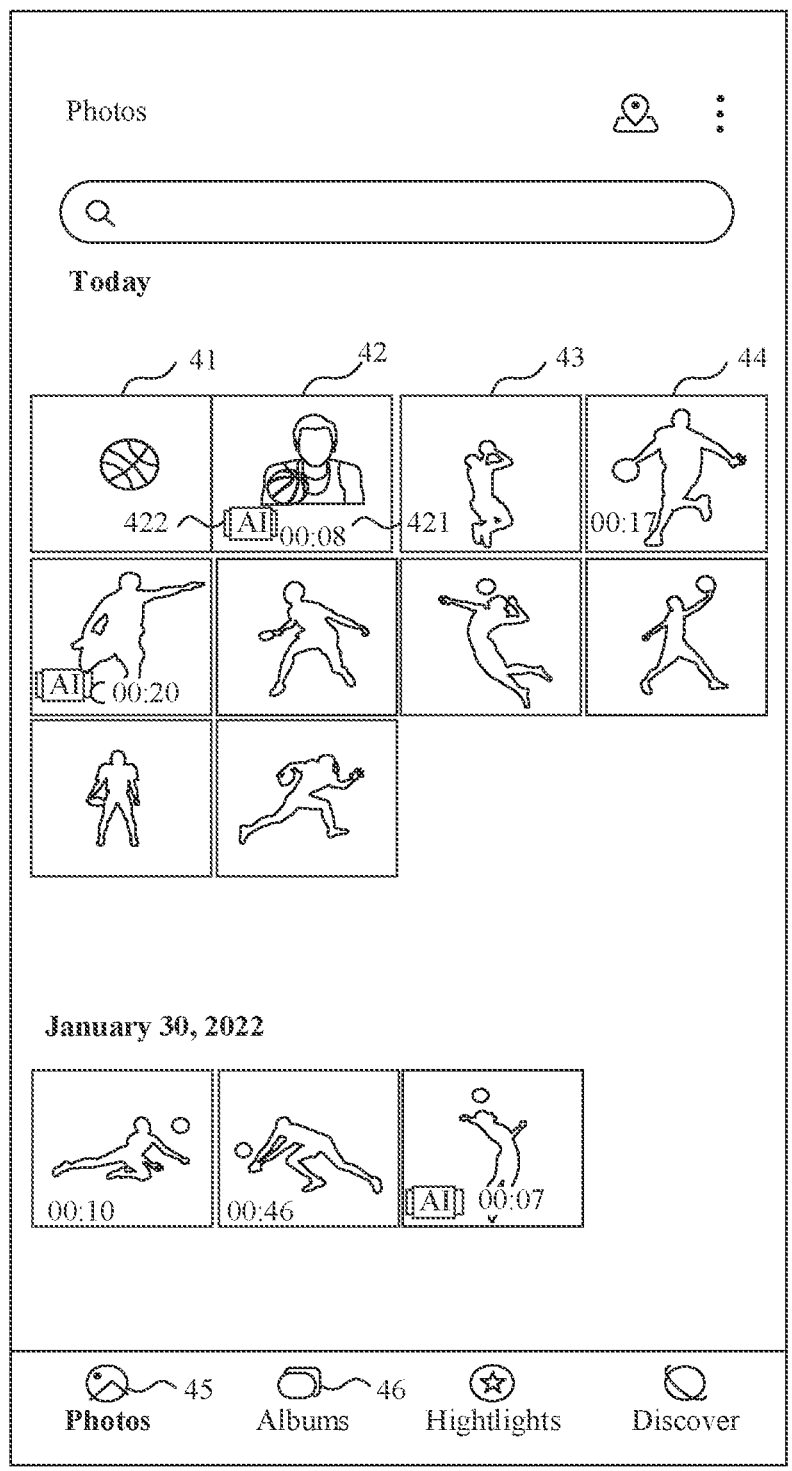
FIG. 4a is a schematic diagram of a fifth graphical user interface according to an embodiment of this application.

As shown in FIG. 4*a*, the user interface 40*a* is a gallery display interface, and the gallery display interface includes thumbnails of videos and photos, and the thumbnails of videos and photos are arranged from the most recent to the least recent by date. The user interface 40*a* includes: a thumbnail 41 corresponding to an image A, a thumbnail 42 corresponding to the video B, a thumbnail 43 corresponding to the image B1, and a thumbnail 44 corresponding to a video C. The thumbnail 42 includes time information 421. The time information 421 is used for indicating that a duration of the video B is 00:08. The thumbnail 42 further includes an "AI" identifier 422. The "AI" identifier 422 is used for indicating that the video B is a one-record-for-multiple-gains video, that is, the electronic device enables the "one record for multiple gains" function when photographing the video B. The thumbnail 44 has no "AI" identifier, that is, the electronic device 100 does not enable the "one record for multiple gains" function when photographing the video C.

Figure 4B:
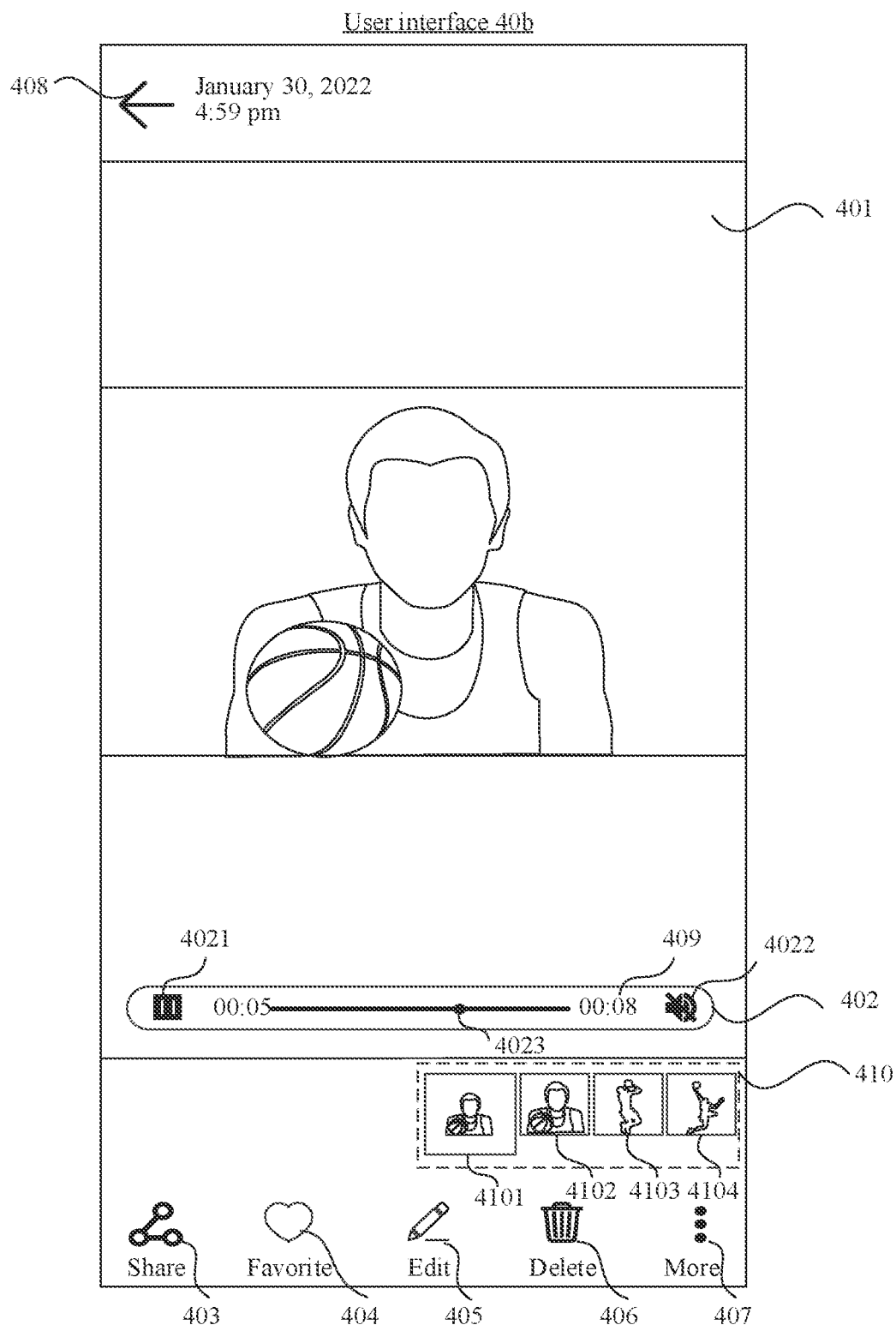
FIG. 4b is a schematic diagram of a sixth graphical user interface according to an embodiment of this application.

The electronic device 100 detects a click/tap operation on the thumbnail 42 on the user interface 40*a*, and the electronic device 100 displays a user interface 40*b* shown in FIG. 4*b* in response to the operation. The user interface 40*b* is a display interface 1 for the one-record-for-multiple-gains video B. The user interface 40*b* includes: a display region 401, a playback progress bar 402, a share control 403, a favorite control 404, an edit control 405, a delete control 406, a "more" function control 407, a return control 408, a photographing time 409 of the video B, and a thumbnail display region 410. The playback progress bar 402 further includes a playback stop control 4021, a sound switch 4022, and a progress controlling control 4023. On the user interface 40*b*, the video B is in a playing state, and when the electronic device 100 detects an operation on the playback stop control 4021, the electronic device 100 pauses playing the video B in response to the operation. On the user interface 40*b*, the video B is in a mute state, when the electronic device 100 detects an operation on the sound switch 4022, the electronic device 100 turns on the sound of the video B in response to the operation. On the user interface 40*b*, the video B is played to 00:05, and the electronic device detects a drag operation on the progress controlling control 4023. In response to the operation, the electronic device 100 jumps to a position at which the progress controlling control 4023 is located for playing. The thumbnail display region 410 includes a thumbnail 4101 of the video B, a thumbnail 4102 of an image B2 associated with the video B, a thumbnail 4103 of an image B3 associated with the video B, and a thumbnail 4104 of an image B4 associated with the video B. A size of the thumbnail 4101 corresponding to the currently displayed video B is larger than sizes of the thumbnail 4102, the thumbnail 4103, and the thumbnail 4104.

Figure 4C:
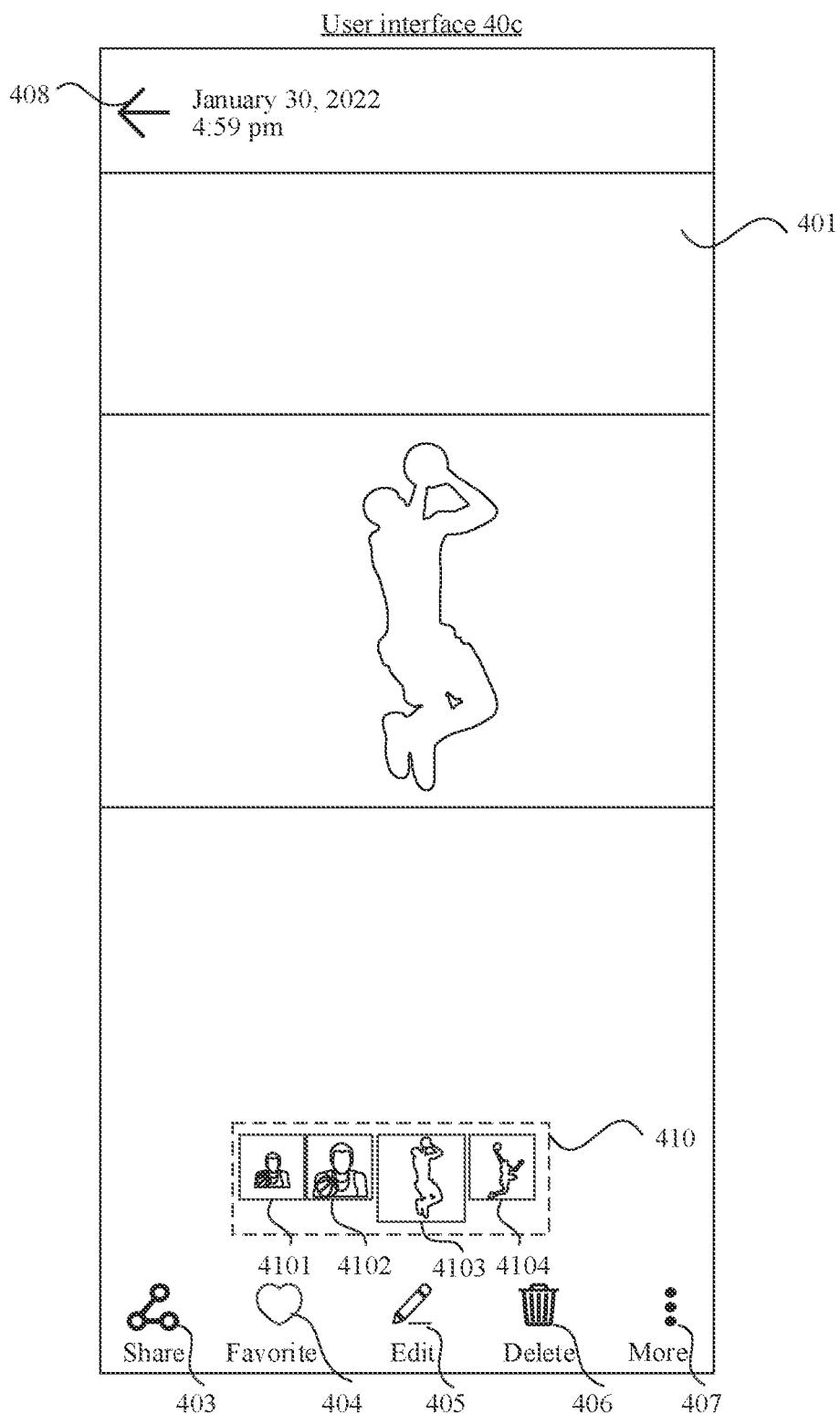
FIG. 4c is a schematic diagram of a seventh graphical user interface according to an embodiment of this application.

The electronic device 100 detects a click/tap operation on the thumbnail 4103, and the electronic device 100 displays a user interface 40*c* shown in FIG. 4*c* in response to the operation. The image B3 corresponding to the thumbnail 4103 is displayed at the display region 401 of the user interface 40*c*. The size of the thumbnail 4103 is larger than sizes of the thumbnail 4101, the thumbnail 4102, and the thumbnail 4104.

It may be understood that, on the user interface 40*b*, if the electronic device 100 detects a click/tap operation on the thumbnail 4102, the electronic device 100 displays the image B2 at the display region 401, and if the electronic device 100 detects a click/tap operation on the thumbnail 4104, the electronic device 100 displays the image B4 at the display region 401.

Figure 4D:
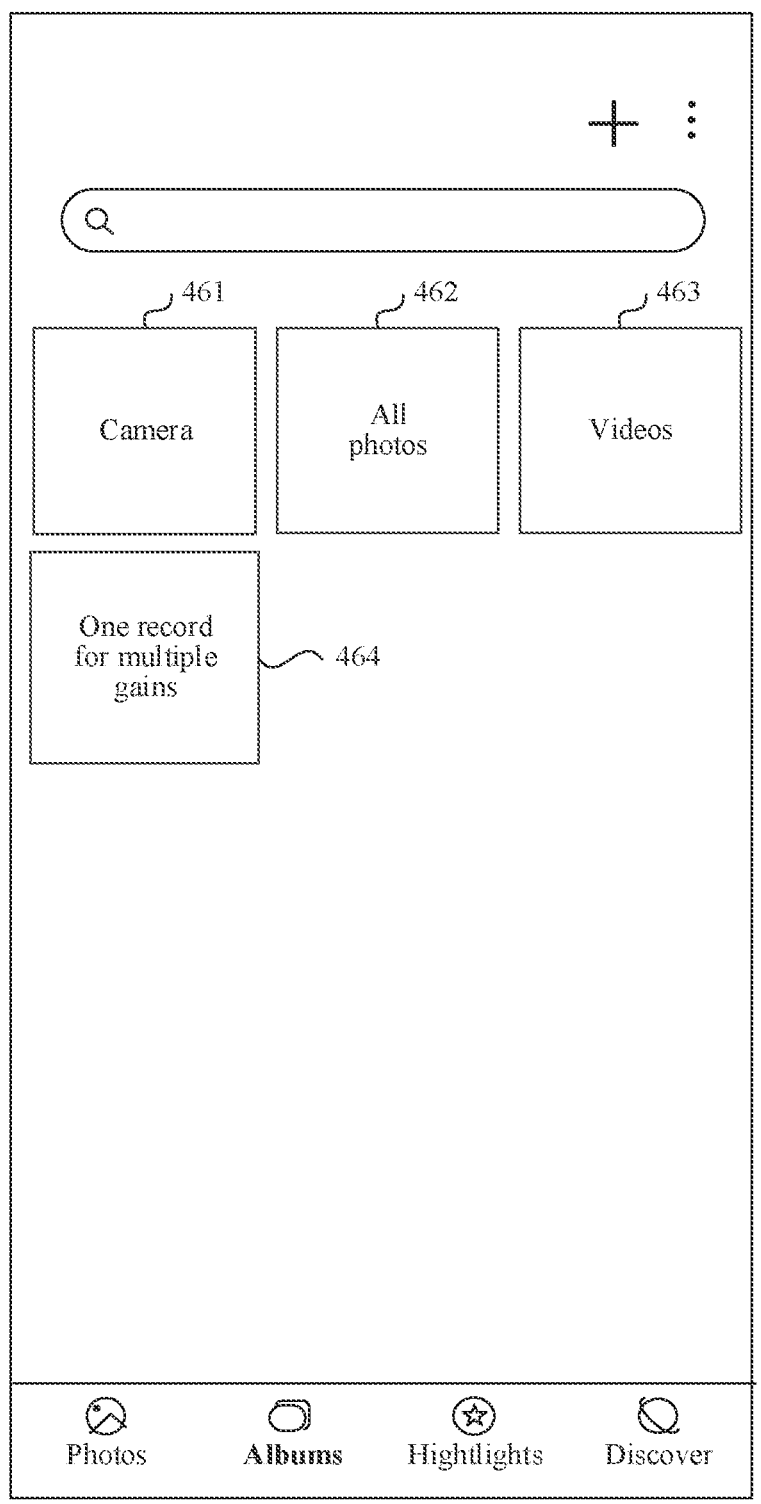
FIG. 4d is a schematic diagram of an eighth graphical user interface according to an embodiment of this application.

The electronic device 100 still detects a click/tap operation on an album control 46 on the user interface 40*a*, and the electronic device displays a user interface 40*d* shown in FIG. 4*d* in response to the operation. FIG. 4*d* shows an album display interface of the gallery, and photos and videos saved in the mobile phone are displayed on the album display interface in the form of folders. For example, the album display interface shown in FIG. 4 *d* includes: a camera folder 461, an all-photos folder 462, a video folder 463, and a one-record-for-multiple-gains folder 464. Certainly, the album display interface may also include other folders, and the folders displayed on the camera display interface are not limited in this application. The camera folder 461 may include photos and videos photographed by the mobile phone through the camera. The all-photos folder 462 may include photos and videos saved by the mobile phone. The video folder 463 may include videos saved in the mobile phone. The one-record-for-multiple-gains folder 464 may include images acquired by the electronic device 100 in the one-record-for-multiple-gains mode.

Figure 4E:
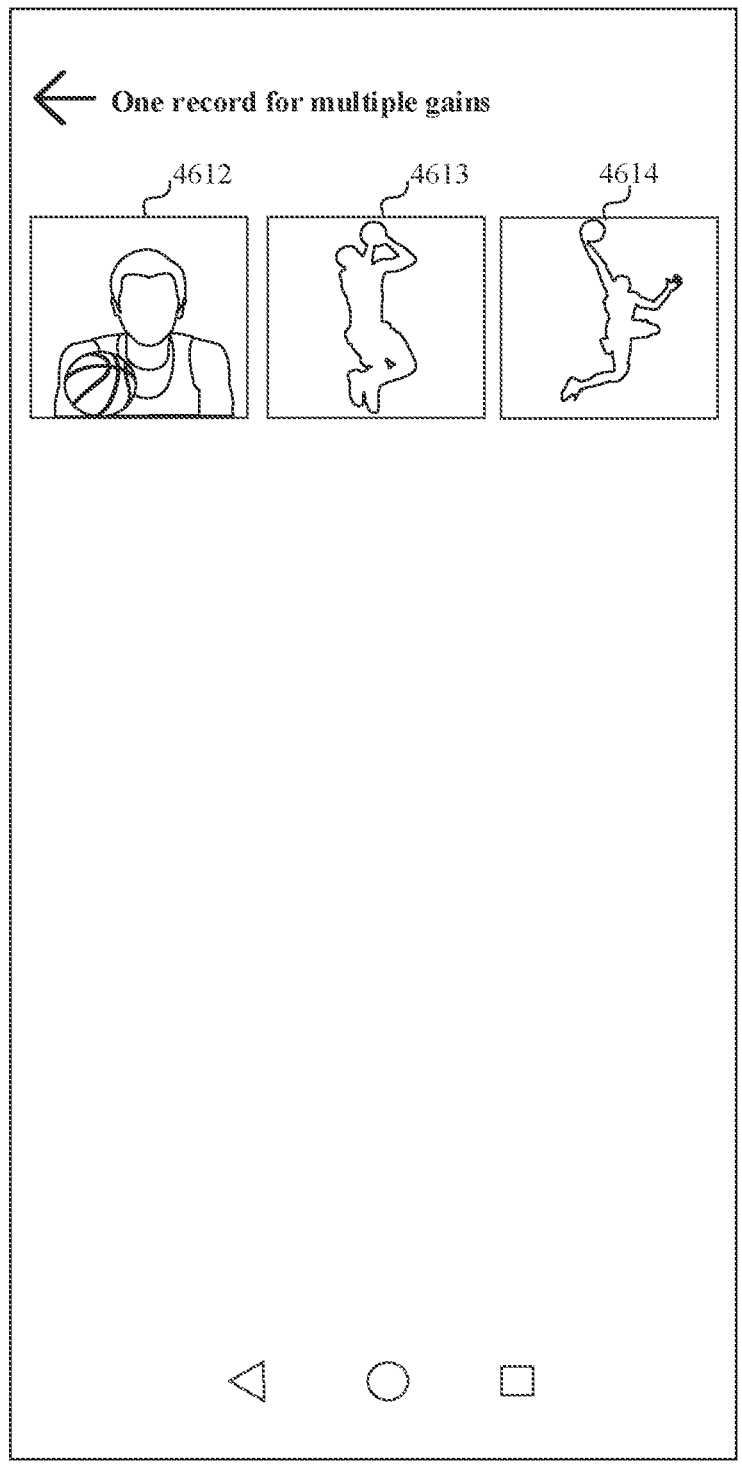
FIG. 4e is a schematic diagram of a ninth graphical user interface according to an embodiment of this application.

The electronic device 100 detects a click/tap operation on the one-record-for-multiple-gains folder 464 on the user interface 40*d*, and the electronic device displays a user interface 40*e* shown in FIG. 4*e*. The user interface 40*e* is a display interface of the one-record-for-multiple-gains folder. The user interface 40*e* includes a thumbnail 4612 of the image B2, a thumbnail 4613 of the image B3, and a thumbnail 4614 of the image B4. In this example, sizes of the thumbnail 4612, the thumbnail 4613, and the thumbnail 4614 are the same. In some other examples, the sizes of the thumbnail 4612, the thumbnail 4613, and the thumbnail 4614 may be different, and the arrangement order may also be different from that in this example.

Figure 5:
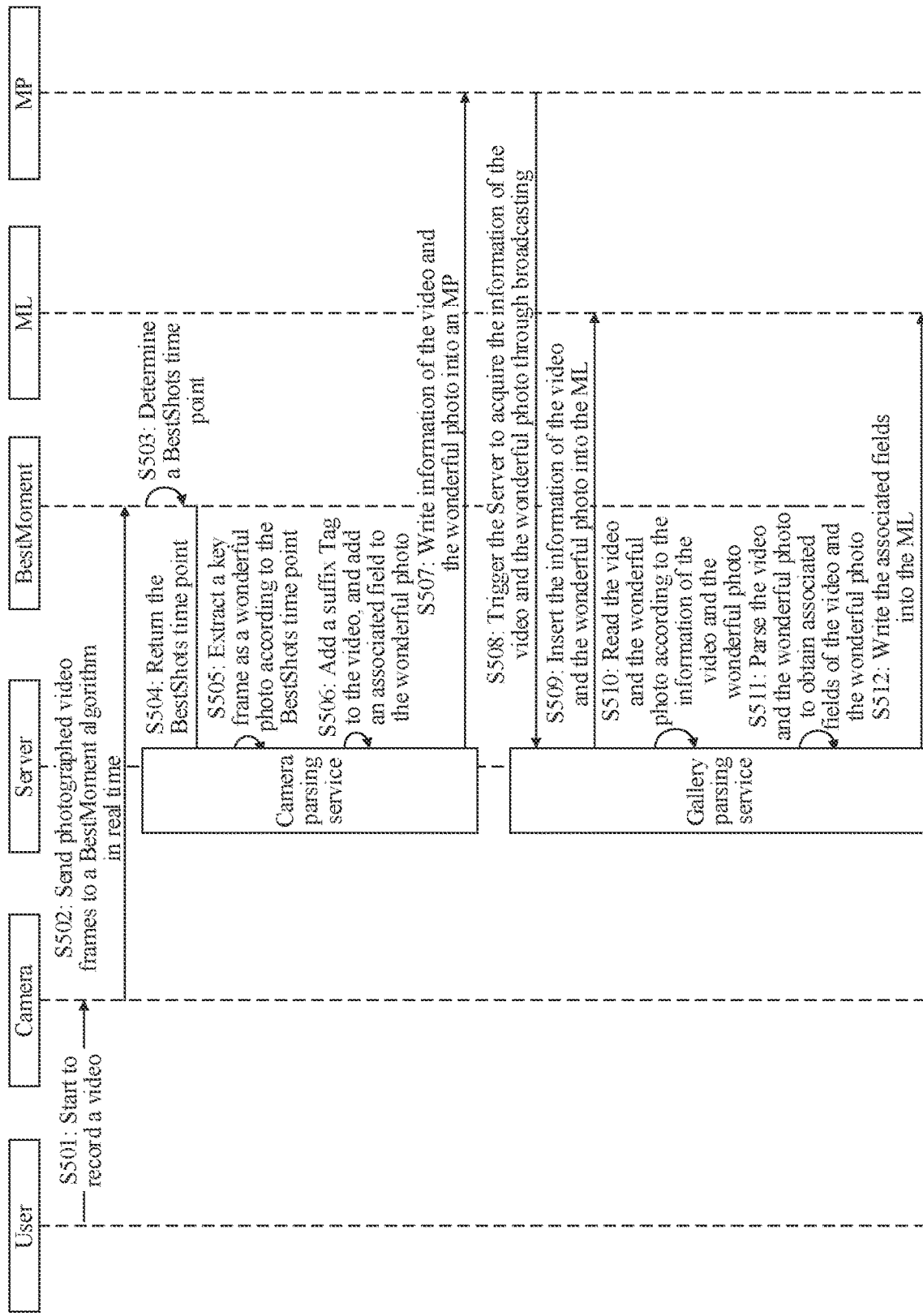
FIG. 5 is a diagram of interaction in which an electronic device records a video in a "one record for multiple gains" mode according to an embodiment of this application.

The foregoing FIG. 4*a* to FIG. 4*e* illustrate playback of a one-record-for-multiple-gains video, and FIG. 5 is a diagram of interaction in which an electronic device records a video in a "one record for multiple gains" mode according to an embodiment of this application. The following describes the manner in which the electronic device records a video in the one-record-for-multiple-gains mode with reference to FIG. 5. In the following example, the electronic device has enabled the "one record for multiple gains" function.

S501: Start to record a video.

The foregoing step may be performed on the user interface 30*b*. The electronic device detects a click/tap operation on the virtual shutter control 316, and in response to the operation, the electronic device starts to record a video.

S502: Send photographed video frames to a BestMoment algorithm in real time.

In the foregoing step, the Camera sends the photographed video frames to the BestMoment algorithm in real time, and the BestMoment algorithm is used for obtaining BestShots time points in the video.

For example, the BestMoment algorithm may screen the BestShots time points according to parameters such as an illumination parameter and a depth-of-field parameter of each frame of image in the video.

S503: Determine a BestShots time point.

The BestShots time point is wonderful moment obtained through calculation by using the BestMoment algorithm, and the time point may be represented by using a timestamp.

S504: Return the BestShots time point.

In the foregoing step, the BestMoment algorithm returns the obtained BestShots time point to a camera parsing service.

S505: Extract a key frame as a wonderful photo according to the BestShots time point.

The camera parsing service extracts a wonderful photo from the video according to the BestShots time point, so as to obtain an image associated with the video.

In some cases, the BestMoment algorithm may return a plurality of BestShots time points to the camera parsing service, and the camera parsing service may screen N time points from the plurality of BestShots time points returned by the BestMoment algorithm, and extract wonderful photos from the video based on the screened N time points.

For example, a quantity threshold N may be set in the camera parsing service. When the quantity of BestShots time points returned by the BestMoment algorithm is greater than the quantity threshold N, time points of N wonderful photos are screened from the BestShots time points returned by the BestMoment algorithm. The screening method may be: scoring images corresponding to the BestShots time points, and selecting the top N time points as time points of wonderful photos. When the quantity of BestShots time points returned by the BestMoment algorithm is less than the quantity threshold N, the BestShots time points returned by the BestMoment algorithm may be directly used as time points of wonderful photos.

For example, the BestMoment algorithm may alternatively return 0 BestShots time points to the camera parsing service. That is, the BestMoment algorithm has not screened any BestShots time point from the video. In this case, although the "one record for multiple gains" function is enabled, the video has no associated wonderful photos.

S506: Add a suffix Tag to the video, and add an associated field to the wonderful photo.

The adding a suffix Tag to the video may be inserting the Tag into the end of the video in the form of JOSN information; and the adding an associated field to the wonderful photo may be inserting the associated field into the Exif of the wonderful photo. After extracting the wonderful photo, the camera parsing service adds a suffix Tag to the video, and adds an associated field to the wonderful image. Descriptions are separately provided below.

For example, a video in an MPEG-4 format is used as an example. A video file in the MPEG-4 format includes file header information. The file header information of the video in the MPEG-4 format may mainly include three parts: General, Video, and Audio. General may include summary information of the video, such as: a video size (File size), a video duration (Duration), an overall bit rate (Overall bit rate), an encoded date (Encoded date), and an Android system version (com.android.version). Video may include video information in the video file, and Audio may include sound information in the video file. When playing the video, the file header information needs to be parsed obtain a corresponding decoding manner, so as to decode the video file in the corresponding decoding manner.

Tag information may be added behind the file header information. For example:

```
"movieTag":
"duration": "47122",
    "id": "71a301ab3fb5412a9a4f54c74c646888",
    "isBgmOn": true,
    "lensInformations": [
      {
        "endTime": 47122,
        "lens"; "back",
        "magicMoment": {
          "scensSlices": [
            {
              "endTime": 11728,
              "scene": "118",
              "startTime": 0,
              "transition": "1"
            },
            {
              "endTime": 12095,
              "scene": "118",
              "startTime": 11728,
              "transition": "5"
            },
            {
              "endTime": 47008,
              "scene": "4",
              "startTime": 12095,
```

```
            "transition": "5"
          }
        ]
      },
      "startTime": 0
    }
  ],
  "magicMoment": {
    "bestShots": [
      36862,
      27262,
      40992,
      8061,
      6028,
      37864,
      17764,
      28295,
      42492,
      4495,
      33802,
      24326,
      526,
      39166,
      14028,
      31763,
      11393,
      15227,
      44160,
      20093
    ],
    "scene": "4",
    "wonderPhotoCnt": 3
  },
  "type": "MagicMomentMovie"
```

The foregoing Tag information mainly includes: a video duration, a group ID, whether background music is turned on, lens switching information, wonderful moments, a video type, and the like, which will be separately described below.

"duration": "47122" is used for describing the video duration.

"id": "71a301ab3fb54f2a9a4f54c74c646888" is used for describing the group ID. A one-record-for-multiple-gains video and wonderful photos associated with the one-record-for-multiple-gains video belong to a same group, thereby having a same group ID.

"isBgmOn": true is used for describing turning on the background music.

"lensInformations" is used for describing the lens switching information.

"magicMoment" is used for describing the wonderful photos in the video. In "magicMoment". "bestShots" are bestShots time points outputted by the BestMomment algorithm, and "wonderPhotoCnt": 3 means that three wonderful photos are selected in this example. In this example, "bestShots" includes 20 timestamps, that is, the BestMoment algorithm returns 20 BestShots time points to the camera parsing service. "wonderPhotoCnt": 3 means that the camera parsing service selects three wonderful photos therefrom.

"type": "MagicMomentMovie" is used for describing that the video type is one-record-for-multiple-gains video.

An associated field of the wonderful photo may be added to Exif information of the wonderful photo. For example:

[Image Information]
  Image width=4096
  Image height=2304
  Image title=magicmoment71a301ab3fb5412a9a4f54c74c646888
  Manufacturer=unknown
  Model=unknown
  Direction=upper/left
  Horizontal resolution=72
  Vertical resolution=72
  Resolution unit=inch
  Modification time=2022-02-08 11:16:40
  YCbCr positioning=centered
  Exif IFD Pointer=Offset: 266
  GPS Info IFD Pointer=Offset: 860
[Camera Photographing Records]
  Exposure time=1/100"
  Aperture=F1.8
  Exposure program=standard program
  ISO sensitivity=115
  Exif version=V2.2
  Photographing time=2022-02-08 11:16:40
  Digitization time=2022-02-08 11:16:40
  9010=+08:00
  9011=+08:00
  Composition=YCbcr
  TV shutter speed=6.64 TV
  AV aperture value=1.69 AV
  BV brightness value=0.18 BV
  Exposure compensation=±0EV
  Maximum aperture=F1.8
  Metering Mode=Unknown
  Light source=other light source
  Flash=off (forced)
  Focal length=5.53 mm
  Manufacturer's note=5 Byte
  Sub-second (modification time)=0.361025"
  Sub-second (photographing time)=0.361025"
  Sub-second (digitization time)=0.361025"
  Flashpix version=V1.0
  Color space=sRGB
  Exif image width=4096
  Exif image height=2304
  Interoperability IFD Pointer=Offset: 829
  Sensing type=undefined
  Scene type=1
  Exposure mode=Auto
  White balance=Auto
  Equivalent 35 mm focal length=23 mm
  Scene photographing type=standard
[GPS Global Positioning]
[Exchangeable Information]
  Exchangeable standard=ExifR98
  Exchangeable version=V1.0
[Thumbnail Information]
  Compression mode=JPEG compression (thumbnail)
  Direction=upper/left
  Horizontal resolution=72
  Vertical resolution=72
  Resolution unit=inch
  JPEG thumbnail start position=offset: 996
  JPEG thumbnail data length=length: 10529
  A002=256
  A003=144
[Tumbnail]
  Thumbnail=256×144
  The added associated field is:
  "Image title=magicmoment71a301ab3fb54f2a9a4f54c74c646888".
  "71a301ab3fb54f2a9a4f54c74c646888" is the group ID of the image.

S507: Write information of the video and the wonderful photo into an MP.

MP (MediaProvider) is a main database of the electronic device. After adding the suffix Tag to the video and adding the associated field in the Exif of the wonderful photo, the Server writes the information of the video and the wonderful photo into the MP of the electronic device. The server further stores the video and the wonderful photo to a storage system of the electronic device.

S508: Trigger the Server to acquire the information of the video and the wonderful photo through broadcasting.

ML (MediaLibrary) is a gallery database of electronic device. After the Server writes the information of the video and the wonderful photos into the MP, the MP broadcasts the event of writing new data. The broadcast triggers the Server to acquire the information of the video and the wonderful photo, and the information of the video and the wonderful photo acquired by the Server includes storage paths and file names of the video and the wonderful photo.

S509: Insert the information of the video and the wonderful photo into the ML.

The Server inserts the information of the video and the wonderful photo acquired from the ML into the ML.

S510: Read the video and the wonderful photo according to the information of the video and the wonderful photo.

The gallery parsing service reads the video and the wonderful photo from the storage system of the electronic device according to the storage paths and the file names of the video and the wonderful photo.

S511: Parse the video and the wonderful photo to obtain associated fields of the video and the wonderful photo.

The gallery parsing service parses the obtained video and the obtained wonderful photo, to obtain associated fields of the video and the wonderful photo. The associated fields may be the group ID written in the file header information of the video and the group ID written in the Exif of the wonderful photo.

S512: Write the associated fields into the ML.

The gallery parsing service writes the associated fields into the ML, and may update the group ID fields in the ML according to the group IDs of the video and the wonderful photo.

FIG. 6 is a schematic diagram of storing one-record-for-multiple-gains videos and wonderful photos in an ML in association with each other according to an embodiment of this application. As shown in FIG. 6, the _id field is used for storing a primary key of the image file (video or image): the _data field is used for storing a storage path of the image file: the _size is used for storing the size of the image file; and the _dispaly_name field is used for storing a display name of the image file. There is also a field ai_video_group_id, and the ai_video_group_id field is used for storing the group ID of the image file. The wonder_photo_count field is used for storing a quantity of wonderful photos corresponding to the video.

In the example in FIG. 6, the ai_video_group_id fields of the video in the seventh row and the image in the eighth row are the same. That is, the video in the seventh row and the image in the eighth row are the same group of images, and the image in the eighth row is a wonderful photo in the video in the seventh row. The wonder_photo_count field indicates that the video in the seventh row has one associated image. Similarly, the video in the third row and the image in the fourth row are the same group of images. That is, the image in the fourth row is a wonderful photo in the video in the third row. The wonder_photo_count field indicates that the video in the third row has one associated image. The wonder_photo_count fields in the first row, the second row, the fifth row, and the sixth row are 0, indicating that the one-record-for-multiple-gains videos in the first row, the second row, the fifth row, and the sixth row have no associated images. The video in the ninth row is "(null)" in the ai_video_group_id field, that is, the video in the ninth row is not a one-record-for-multiple-gains video.

It should be noted that the ML further includes more fields not shown in FIG. 6, and the structure of the database in FIG. 6 is only for an example. This application is not limited thereto.

Figure 7:
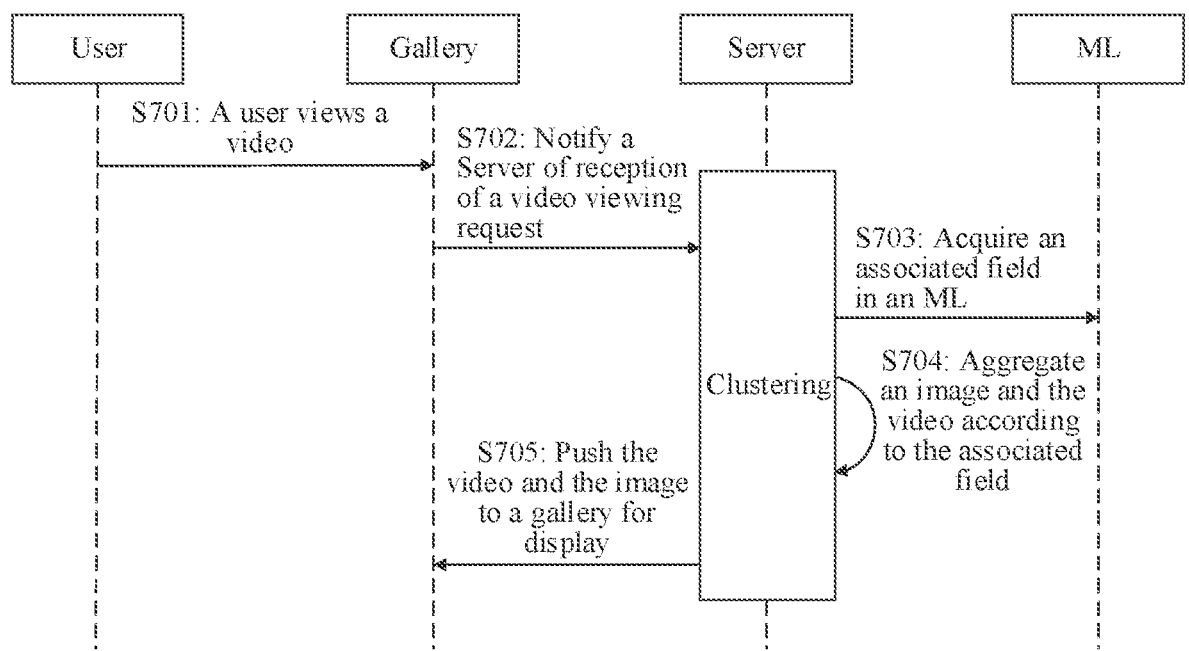
FIG. 7 is a diagram of interaction in which a user views a video according to an embodiment of this application.

The process of recording a video by the electronic device 100 in a case that the "one record for multiple gains" function is enabled is described above with reference to FIG. 5. FIG. 7 is a diagram of interaction in which a user views a video according to an embodiment of this application. The following describes that a user views a video.

S701: A user views a video.

The user may view the video photographed with the "one record for multiple gains" function enabled in the gallery of the electronic device. The one-record-for-multiple-gams video may be displayed on the gallery display interface of the electronic device together with other videos and images.

With reference to FIG. 3a, the electronic device 100 detects a click/tap operation on the gallery icon 32 and the gallery of the electronic device 100 is entered. The electronic device 100 displays a user interface 40a shown in FIG. 4a, and the user interface 40a is the gallery display interface of the electronic device 100. Thumbnails of videos and images, including thumbnails of one-record-for-multiple-gains videos, are displayed on the gallery display interface of the electronic device 100. The user may click a thumbnail corresponding to a one-record-for-multiple-gains video to be viewed to send a viewing request to the gallery, and the electronic device 100 continues to perform the following steps after receiving the user's operation of viewing the video.

S702: Notify a Server of reception of a video viewing request.

In the foregoing step, the Gallery notifies the Server of reception of the video viewing request, to trigger the ML to search for an image associated with the video through clustering.

S703: Acquire an associated field in an ML.

The associated field may be the ai_video_group_id field shown in FIG. 6, and the one-record-for-multiple-gains video and the associated image have a same ai_video_group_id field.

S704: Aggregate an image and the video according to the associated field.

The server searches for an image having the same ai_video_group_id according to the ai_video_group_id field of the one-record-for-multiple-gains video selected by the user, and clusters the one-record-for-multiple-gains video selected by the user and the found image as a group.

S705: Push the video and the image to a gallery for display.

The server pushes the one-record-for-multiple-gains video selected by the user and the found image to the gallery for displaying in the gallery. The user interface 40b shown in FIG. 4b may be used as an example.

Figure 8:
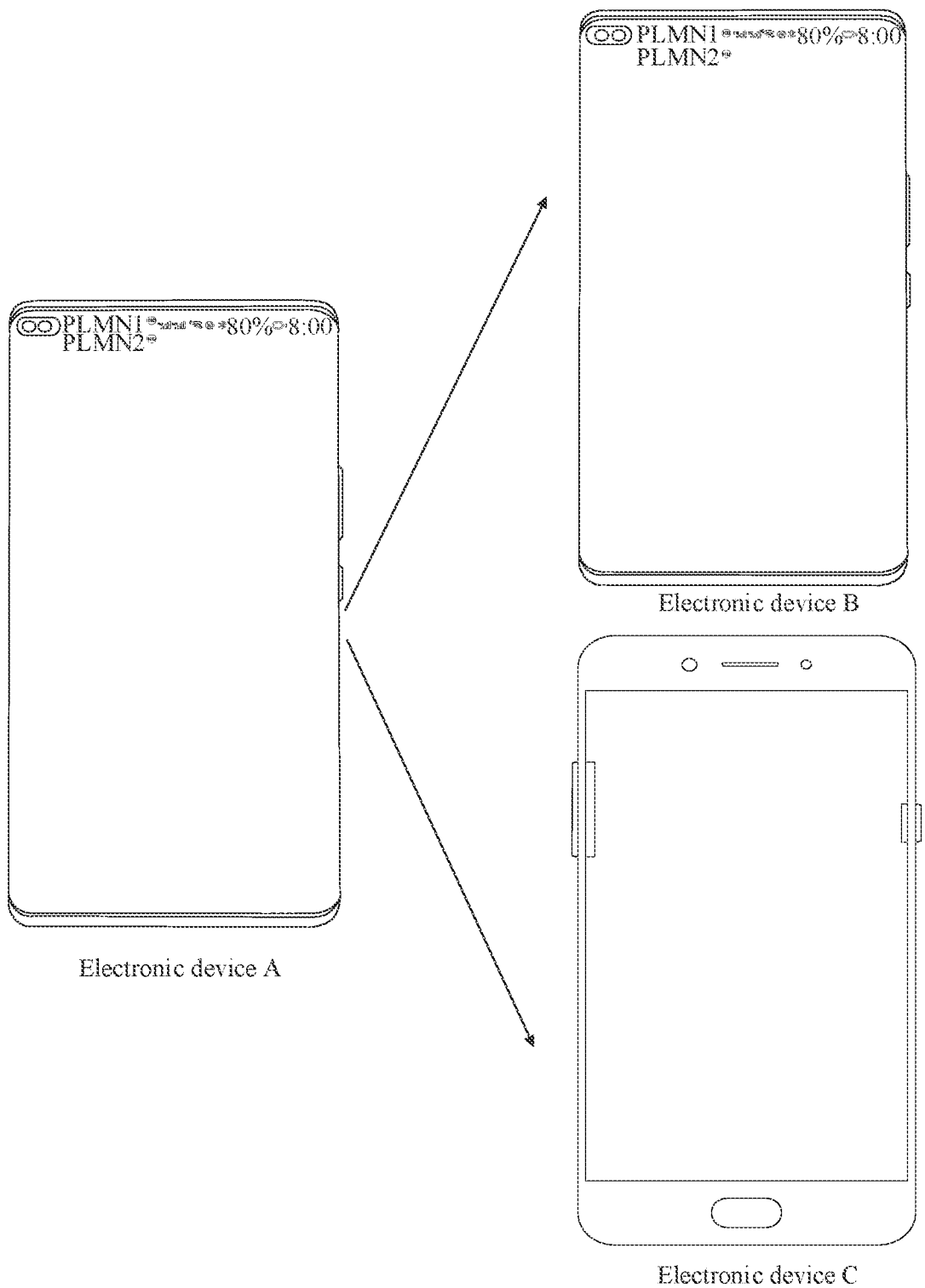
FIG. 8 is a diagram of interaction in which electronic devices share a video and images according to an embodiment of this application.

The video recorded with the "one record for multiple gains" function enabled and the associated image may also be shared. As shown in FIG. 8, an electronic device A and an electronic device B have the capability to parse Tag information in a video, and have the capability to parse associated fields in Exif information of associated images, and an electronic device C does not have the foregoing capabilities.

The electronic device A sends the video B, the image B2, the image B3, and the image B4 to the electronic device B. After receiving the video B, the image B2, the image B3, and the image B4, the electronic device B may parse the Tag information in the video B and the associated fields in the image B2, the image B3, and the image B4, and associate the video B with the image B2, the image B3, and the image B4 according to the parsed Tag information in the video B and the parsed associated fields in the image B2, the image B3, and the image B4, so that the video B may be displayed in the manner shown in FIG. 4b.

Figure 9A:
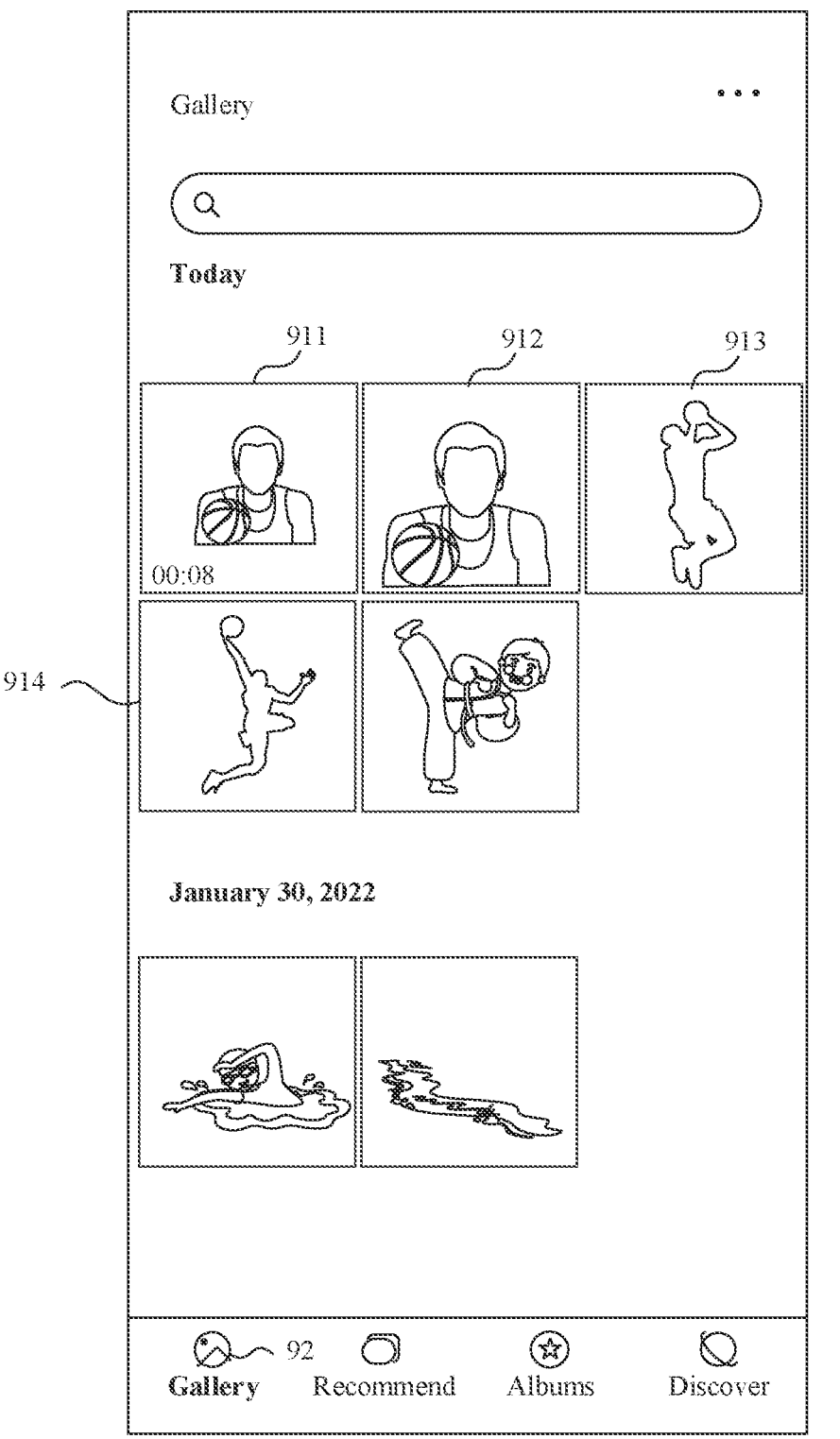
FIG. 9a is a schematic diagram of a tenth graphical user interface according to an embodiment of this application.

The electronic device A sends the video B, the image B2, the image B3, and the image B4 to the electronic device C. After receiving the video B, the image B2, the image B3, and the image B4, the electronic device C cannot parse the Tag information in the video B and the associated fields in the image B2, the image B3, and the image B4, but can display the video B, the image B2, the image B3, and the image B4 separately. A description will be provided below by using FIG. 9a to FIG. 9c as an example.

The electronic device C stores the received video B, image B2, image B3, and image B4 in the gallery. After the gallery of electronic device C is entered, the electronic device C displays a user interface 90a shown in FIG. 9a, and the user interface 90a is a gallery interface of electronic device C. On the user interface 90a, a gallery control 92 has been selected. The user interface 90a includes: a thumbnail 911 of the video B, a thumbnail 912 of the image B2, a thumbnail 913 of the image B3, and a thumbnail 914 of the image B4.

Figure 9B:
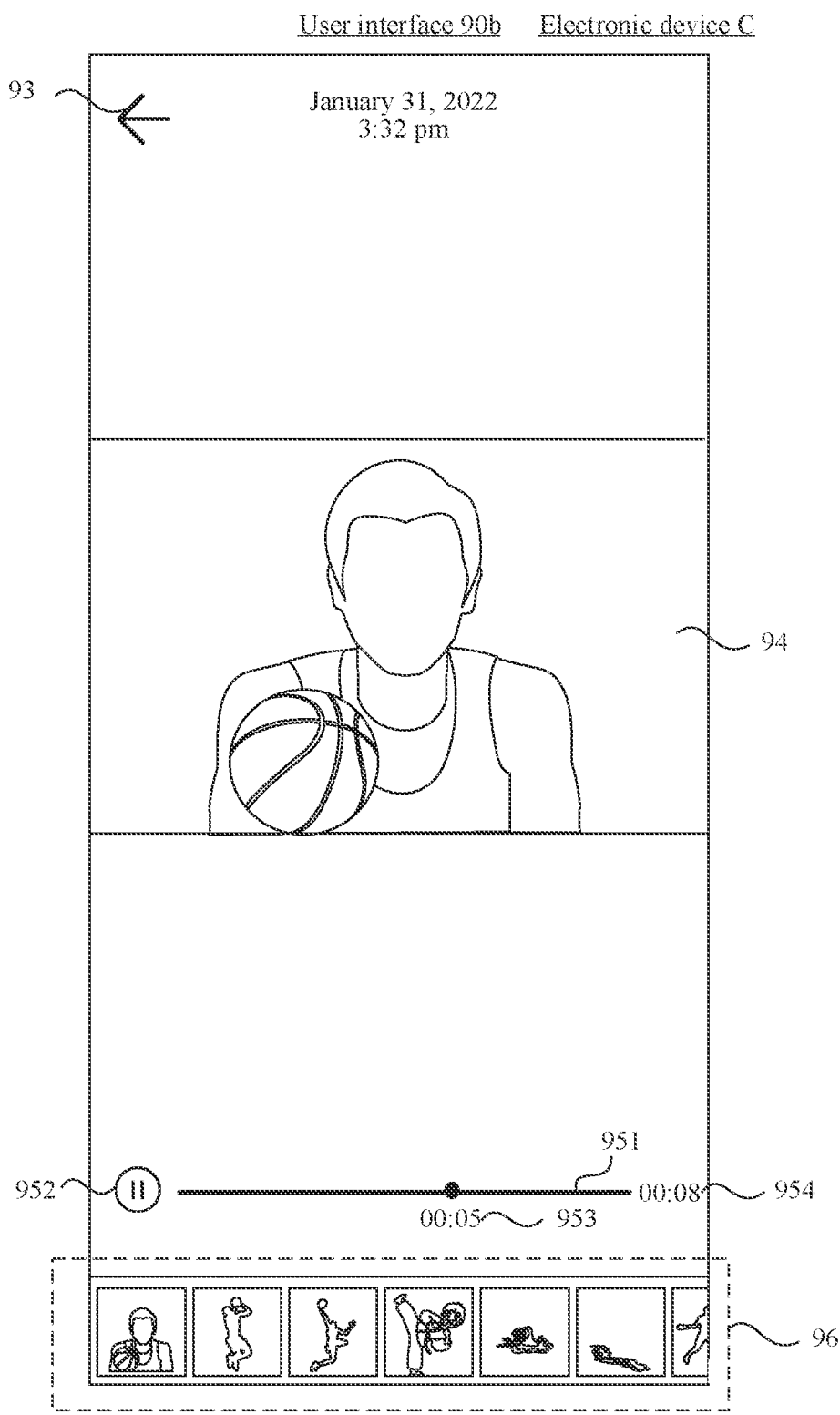
FIG. 9b is a schematic diagram of an eleventh graphical user interface according to an embodiment of this application.

The user selects the thumbnail 911 of the video B on the user interface 90a, and the electronic device C displays the user interface 90b shown in FIG. 9b. The user interface 90b is a playback interface of the video B. The user interface 90b includes: a return control 93, a display region 94, a progress bar 951, a pause control 952, a playback time 953, a total time 954, and a thumbnail display region 96. The electronic device C detects a click/tap operation on the return control 93, and the electronic device C returns to the user interface 90a in response to the operation. The display region 94 is configured for playing the video B. The progress bar 951 is configured to display a playback progress of the video B. The electronic device C detects an operation on the pause control 952, and the electronic device C stops playing the video B in response to the operation. The thumbnail display region 96 may be configured for displaying thumbnails of other videos in the gallery, and may also be configured for displaying thumbnails of other images and videos in the gallery.

Figure 9C:
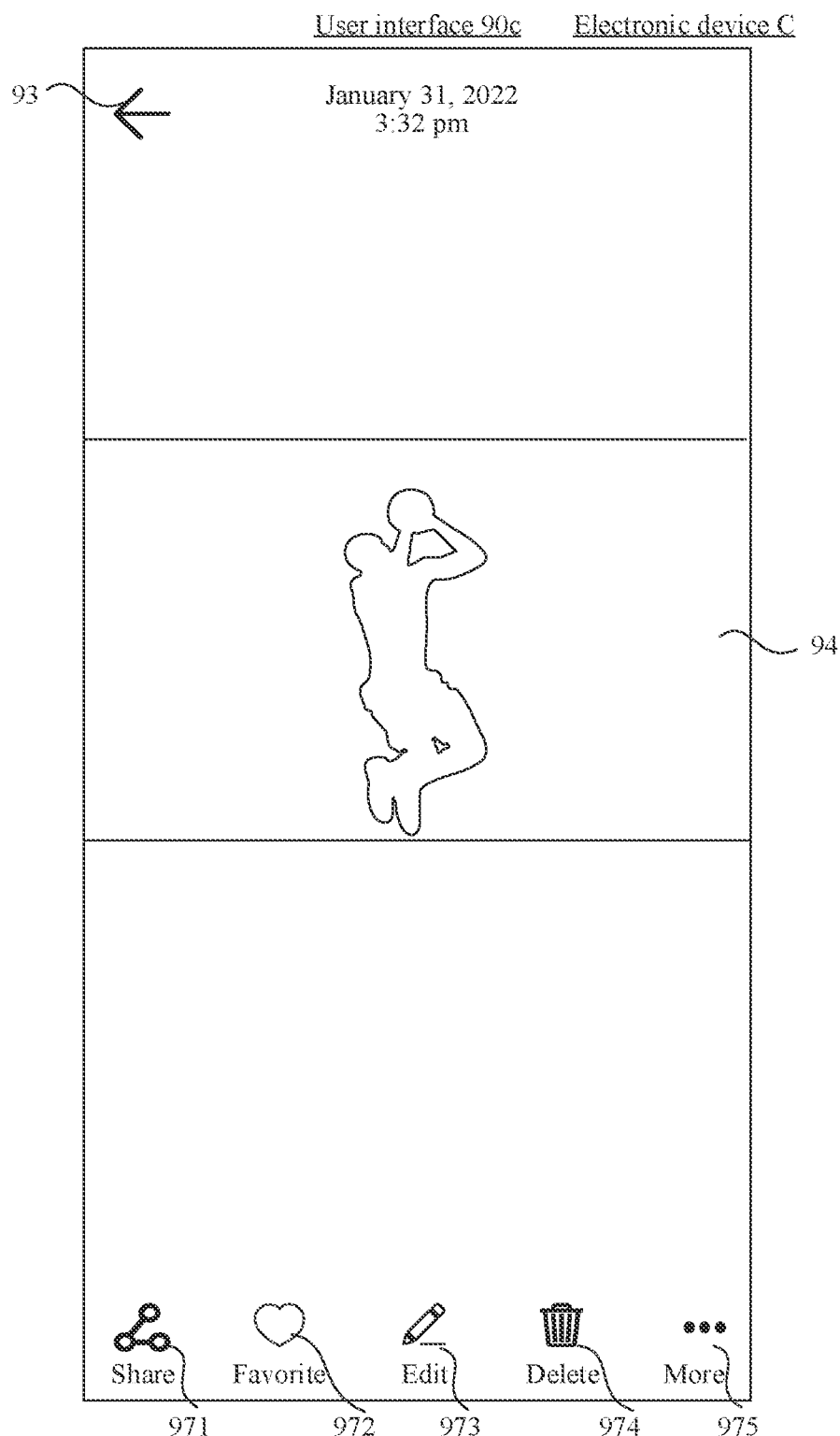
FIG. 9c is a schematic diagram of a twelfth graphical user interface according to an embodiment of this application.

The electronic device C detects a click/tap operation on the thumbnail 913 on the user interface 90a, and the electronic device C displays a user interface 90c shown in FIG. 9c. The user interface 90c is a display interface of the image B3. The user interface 90c includes: a return control 93, a display region 94, a share control 971, a favorite control 972, an edit control 973, a delete control 974, and a "more" function control 975.

Figure 10:
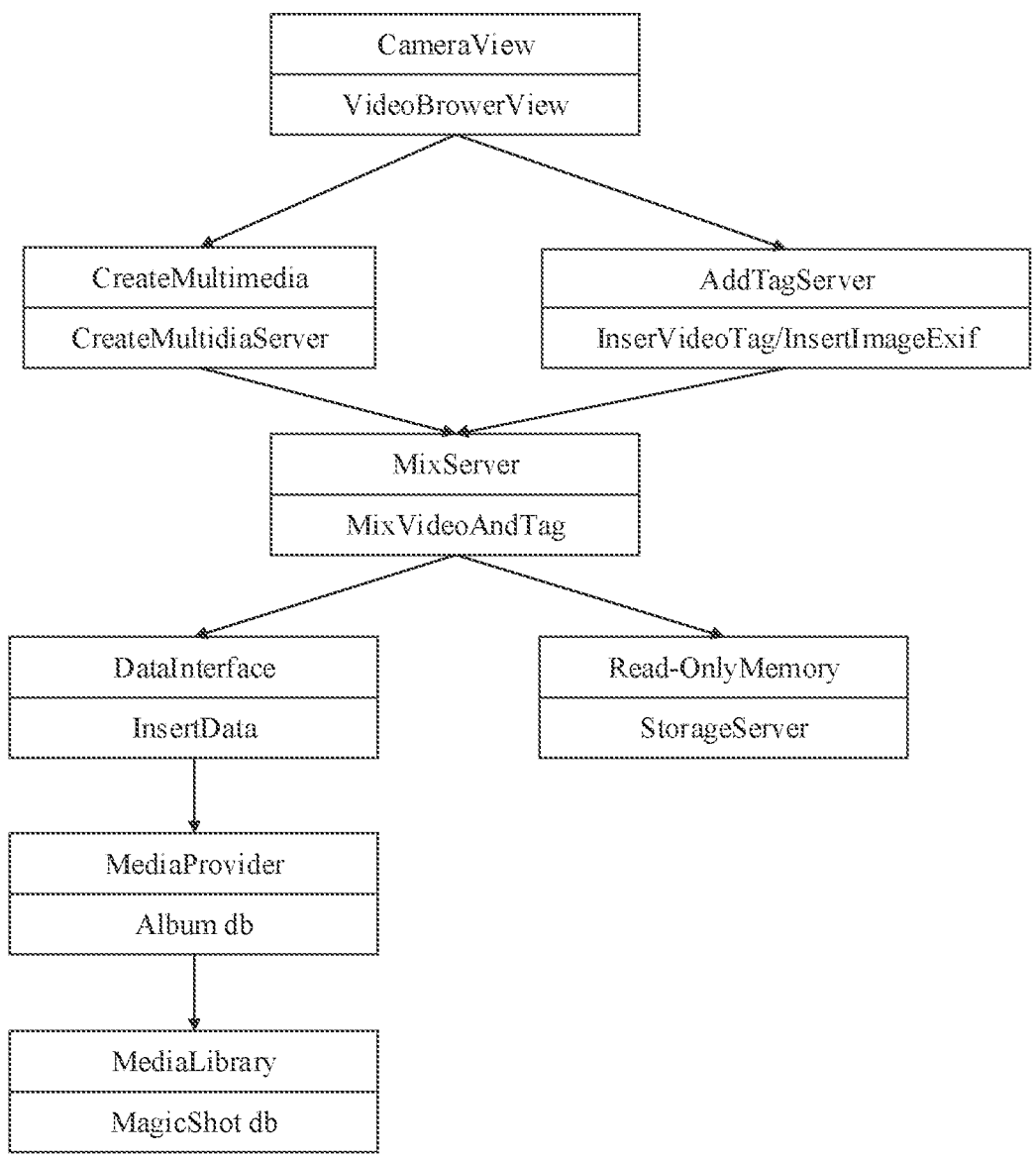
FIG. 10 is an abstract schematic flowchart according to an embodiment of this application.

FIG. 10 is an abstract schematic flowchart according to an embodiment of this application. As shown in FIG. 10, the electronic device displays a camera interface (CameraView) through a VideoBrowerView function, and the user performs video recording on the camera interface of the electronic device. The electronic device records a video (CreateMultimedia) based on a video recording service (CreateMultidiaServer), and adds a video tag (InserVideoTag) and/or an image tag (InsertimageExif) based on a tag adding service (AddTagServer) in real time. The video and the video tag are encoded (EncodeVideoAndTag) through an encoding service (EncodeServer). The electronic device then calls a data interface (Datainterface) to insert data (InsertData), and inserts the encoded video into an image set (Album db) of the main database (MediaProvider). The electronic device also stores the encoded video in the Read-OnlyMemory through a storage service (StorageServer). The gallery database (MediaLibrary) may acquire wonderful photo data (MagicShot db) from the main database.

Figure 11:
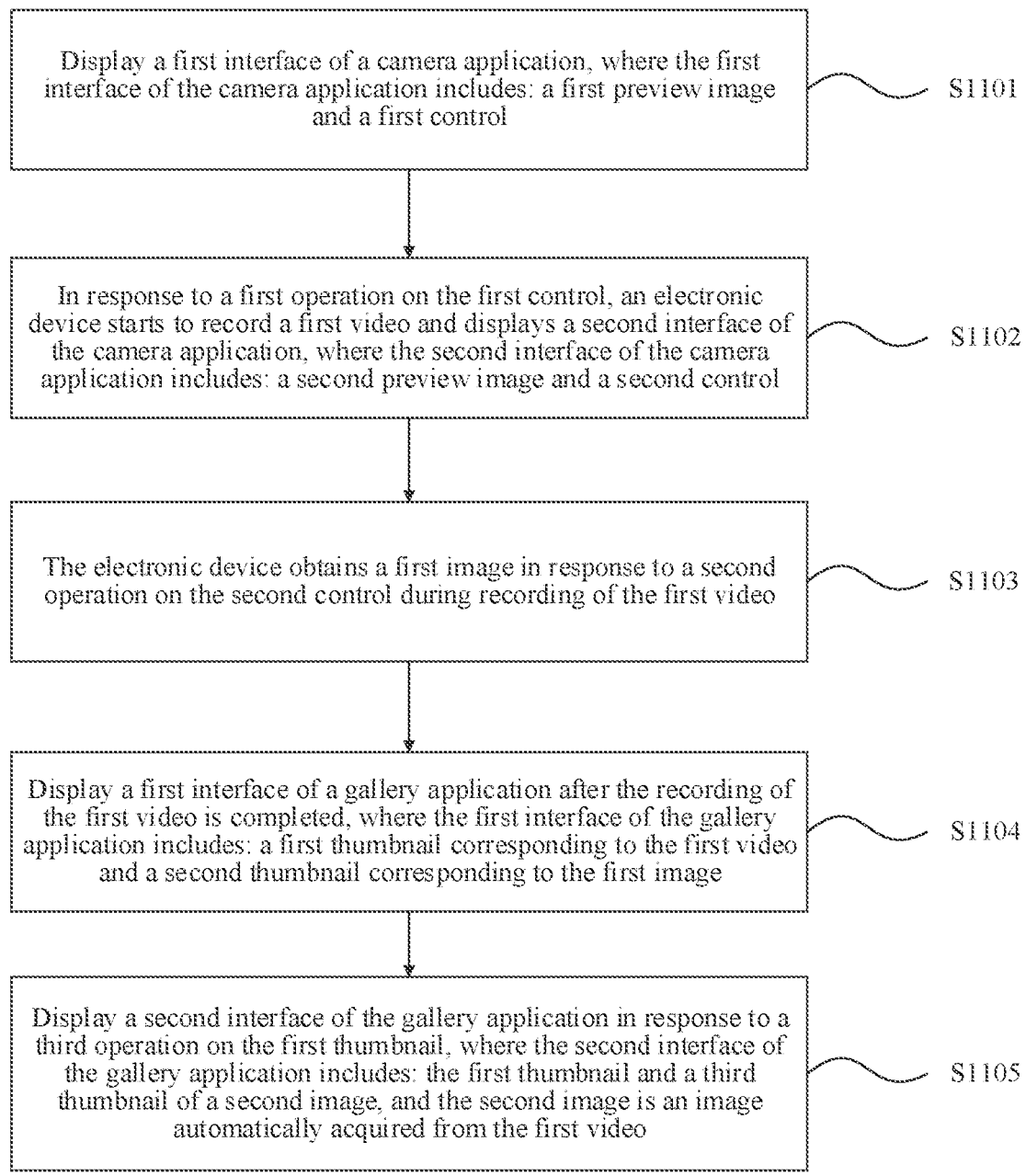
FIG. 11 is a flowchart of a video processing method according to an embodiment of this application.

FIG. 11 is a flowchart of a video processing method according to an embodiment of this application. The method can be applied to the electronic device shown in FIG. 1. As shown in FIG. 11, the method mainly includes the following steps.

S1101: Display a first interface of a camera application, where the first interface of the camera application includes: a first preview image and a first control.

The first interface of the camera application may be a photographing interface of the electronic device in the camera application. As shown in FIG. 3b, the first interface of the camera application may be a user interface 30b, the first preview image may be an image displayed in a preview region 311 on the user interface 30b, and the first control may be a virtual shutter control 316.

S1102. In response to a first operation on the first control, the electronic device starts to record a first video and displays a second interface of the camera application, where the second interface of the camera application includes: a second preview image and a second control.

Still with reference to FIG. 3b, the first operation may be a click/tap operation on the virtual shutter control 316. The second interface of the camera application may be as shown in the user interface 30d of FIG. 3d. The second preview image may be an image displayed in the photographing preview region 321, and the second control may be a photo taking control 327.

S1103: The electronic device obtains a first image in response to a second operation on the second control during recording of the first video.

Still with reference to FIG. 3d, the second operation on the second control may be a click/tap operation on the photo taking control 327. In the foregoing step, a photo is taken during the recording of the first video by the electronic device, to obtain the first image.

S1104: Display a first interface of a gallery application after the recording of the first video is completed, where the first interface of the gallery application includes: a first thumbnail corresponding to the first video and a second thumbnail corresponding to the first image.

The first interface of the gallery application may be the user interface 40a shown in FIG. 4a. The first video may be the video B in the foregoing embodiments, the first thumbnail corresponding to the first video may be the thumbnail 42 corresponding to the video B, the first image may be the image B1 in the foregoing embodiment, and the second thumbnail corresponding to the first image may be the thumbnail 43.

S1105: Display a second interface of the gallery application in response to a third operation on the first thumbnail, where the second interface of the gallery application includes: the first thumbnail and a third thumbnail of a second image, and the second image is an image automatically acquired from the first video.

Still with reference to FIG. 4a, the third operation may be an operation of clicking/tapping the thumbnail 42. The second interface of the gallery application may be the user interface 40b shown in FIG. 4b. The second image may be the image B3 in the foregoing embodiments, and the second image may alternatively be an image obtained by fusing a plurality of frames of video in the first video. The third thumbnail of the second image may be the thumbnail 4103.

The second interface of the gallery application may alternatively be different from the user interface 40b. For example, the first thumbnail and the third thumbnail may be displayed on the second interface of the gallery application, and when the electronic device detects an operation on the first thumbnail, the user interface 40b is then displayed in response to the operation.

In the foregoing embodiment of this application, in a case that the electronic device enables a "one record for multiple gains" function, the electronic device automatically generates an image associated with a video obtained through recording, and the image can be used as a wonderful photo of the video. On a gallery display interface of the album application, thumbnails of manually recorded videos and manually photographed images are displayed, and after the electronic device detects an operation on a video, an image associated with the video is displayed. In such a display manner, the image associated with the video is prevented from interfering with the display interface of the gallery, and an association between the video and the image associated with the video can be displayed, thereby achieving the objective of being convenient for users to view.

In an optional implementation, the second interface of the gallery application further includes the first video.

An example in which the second interface of the gallery application is the user interface 40b is used. The first video may be a video displayed at the display region 401.

In an optional implementation, in response to the third operation on the first thumbnail, the first video is played silently on the second interface of the gallery application, the second interface of the gallery application further includes: a progress bar, a third control, and a fourth control, and the method further includes: pausing, in response to a fourth operation on the third control, playing the first video: playing sound of the first video in response to a fifth operation on the fourth control; and adjusting a playback progress of the first video in response to a sixth operation on the progress bar.

An example in which the second interface of the gallery application is the user interface 40b is still used. The third control may be the playback stop control 4021, the fourth control may be the sound switch 4022, and there may be the progress controlling control 4023 on the progress bar. The electronic device detects a drag operation on the progress controlling control 4023, and in response to the operation, the electronic device 100 jumps to a position at which the progress controlling control 4023 is located for playing.

In an optional implementation, after the displaying a second interface of the gallery application in response to a third operation on the first thumbnail, the method further includes: displaying a third interface of the gallery application in response to a seventh operation on the third thumbnail, where the third interface of the gallery application includes: the first thumbnail, the second image, and the third thumbnail.

The seventh operation may be a click/tap operation on the thumbnail 4613. The third interface of the gallery application may be the user interface 40c shown in FIG. 4c, or the user interface of the second image may be independently displayed.

In an optional implementation, on the second interface of the gallery application, the first thumbnail is larger than the third thumbnail; and on a third interface of the gallery application, the third thumbnail is larger than the first thumbnail.

In an optional implementation, the method further includes: displaying a fourth interface of the gallery application, where the fourth interface of the gallery application includes: a first folder: displaying a fifth interface of the gallery application in response to an eighth operation on the first folder, where the fifth interface of the gallery application includes the third thumbnail; and displaying a sixth interface of the gallery application in response to a ninth operation on the third thumbnail, where after the recording of the first video is completed, the sixth interface of the gallery application automatically includes the second image.

The fourth interface of the gallery application may be the user interface 40d shown in FIG. 4d. The first folder may be a one-record-for-multiple-gains folder 464. The eighth operation may be a click/tap operation on the one-record-for-multiple-gains folder 464. The ninth operation may be an operation on the third thumbnail, and in response to the ninth operation, the second image is displayed on the sixth interface of the gallery application.

In an optional implementation, the sixth interface of the gallery application further includes: the first thumbnail and the third thumbnail.

The sixth interface of the gallery application may be the user interface 40e shown in FIG. 4e, and the third thumbnail may be the thumbnail 4613 on the user interface 40e.

In an optional implementation, the fourth interface of the gallery application further includes a second folder, and the method further includes: displaying a seventh interface of the gallery application in response to a tenth operation on the second folder, where after the recording of the first video is completed, the seventh interface automatically includes the second thumbnail.

The second folder may be the camera folder 461 on the user interface 40d. The electronic device detects an operation on the camera folder 461 and displays a thumbnail of an image manually captured by the electronic device, for example, the second thumbnail.

In an optional implementation, the second interface of the camera application further includes a fifth control, and after the in response to a first operation on the first control, starting, by an electronic device, to record a first video and displaying a second interface of the camera application, the method further includes: ending, by the electronic device in response to an eleventh operation on the fifth control, recording the first video and displaying the first interface of the camera application, where the first interface of the camera application further includes a sixth control; and displaying the second interface of the gallery application in response to a twelfth operation on the sixth control.

The fifth control may be the recording stop control 326 on the user interface 30d. In response to a click/tap operation on the recording stop control 326, the electronic device ends the recording of the first video and displays the user interface 30b shown in FIG. 3b. The sixth control may be the gallery control 315 on the user interface 30b, and in response to a click/tap operation on the gallery control 315, the electronic device displays the user interface 40b.

In an optional implementation, before the in response to a first operation on the first control, starting, by an electronic device, to record a first video and displaying a second interface of the camera application, the method further includes: acquiring the second image during recording of the first video in a case that the electronic device photographs the first video in a first photographing mode; and skipping, in a case that the electronic device photographs a second video in a second photographing mode, automatically acquiring an image from the second video during recording of the second video.

The first photographing mode may be a "one record for multiple gains" mode, and the manner of enabling the "one record for multiple gains" mode may be shown in FIG. 3c. Details are not described herein again.

In an optional implementation, before the displaying a second interface of the gallery application in response to a third operation on the first thumbnail, the method further includes: parsing the first video corresponding to the first thumbnail, to obtain a group identifier corresponding to the first video; and searching for an image having a same group identifier as the first video, and determining that a found image is the second image.

The manner for the user to view the video may be shown in FIG. 7. The searching for an image having a same group identifier as the first video, and determining that a found image is the second image may be shown in step 704, and details are not described herein again.

In an optional implementation, file header information of the first video includes tag information, and the tag information includes a group identifier of the first video; and an image file of the second image includes a group identifier of the second image, and the group identifier of the second image is the same as the group identifier of the first video.

The steps in which the tag information may be added to the end of the file header information of the first video, where the tag information includes the group identifier of the first video; and the group identifier of the second image may be added to the image file of the second image, where the group identifier of the second image is the same the group identifier of the first video may be shown in S505 to S512 in FIG. 5, and details are not described herein again.

In an optional implementation, a database includes a first field, and the first field includes the group identifier of the first video and the group identifier of the second image.

The first field may be the ai_video_group_id shown in FIG. 6, which is specifically shown in FIG. 6. Details are not described herein again.

In an optional implementation, the database includes a second field, and the second field corresponding to the first video is used for describing a quantity of images having a same group identifier as the first video.

The second field may be thewonder_photo_count shown in FIG. 6, which is specifically shown in FIG. 6. Details are not described herein again.

In an optional implementation, file header information of the first video includes a first identifier, an image file of a third image includes a second identifier, the first identifier is associated with the second identifier, and the second interface of the gallery application further includes a fourth thumbnail of the third image.

The first identifier of the first video may be a group identifier of the first video, and the second identifier of the third image may be a group identifier of the third image. If the second identifier of the third image is changed in the database to be related to the first identifier, when the second interface of the gallery application is displayed, the fourth thumbnail of the third image will be displayed on the second interface of the gallery application. Similarly, the fourth thumbnail of the third image will also be displayed on the first interface of the gallery application.

In an optional implementation, the first identifier is the same as the second identifier.

An embodiment of this application further provides an electronic device, including the processor. The electronic device provided in this embodiment may be the terminal device 100 shown in FIG. 1, and the terminal device 100 is configured to perform the foregoing video processing method. When an integrated unit is used, the electronic device may include a processing module, a storage module, and a storage module. The processing module may be configured to control and manage an action of the terminal device, for example, may be configured to support the terminal device in performing steps performed by a display unit, a detection unit, and a processing unit. The storage module may be configured to support the terminal device in storing program code, data, and the like. The storage module may be configured to support communication between the terminal device and another device.

The processing module may be a processor or controller. The processor may implement or perform various examples of logic blocks, modules, and circuits described with reference to content disclosed in this application. The processor may alternatively be a combination for implementing computing functions, for example, a combination of one or more microprocessors, a combination of a digital signal processor (digital signal processor, DSP) and a microprocessor. The storage module may be a memory. The communication module may specifically be a radio frequency circuit, a Bluetooth chip, a Wi-Fi chip, or another device that interacts with another terminal device.

In an embodiment, when the processing module is a processor and the storage module is a memory, the terminal device in this embodiment may be a device be of the structure shown in FIG. 1.

An embodiment of this application further provides a computer-readable storage medium. The computer-readable storage medium stores instructions. When the instructions are run on a computer or processor, the computer or processor is enabled to perform one or more steps in any one of the foregoing methods.

The computer-readable storage medium may be a non-transitory computer-readable storage medium. For example, the non-temporary computer-readable storage medium may be a ROM, a random access memory (RAM), a CD-ROM, a tape, a floppy disk, or an optical data storage device.

Another embodiment of this application further provides a computer program product including instructions. When the computer program product runs on a computer or processor, the computer or processor is enabled to perform one or more steps in any one of the foregoing methods.

The electronic device, the computer-readable storage medium, and the computer program product provided in the embodiments may be configured to perform the corresponding method provided above. Therefore, for beneficial effects that can be achieved, reference may be made to the beneficial effects of the corresponding method provided above. Details are not described herein again.

In the several embodiments provided in this application, it should be understood that the disclosed apparatus and method may be implemented in other manners. For example, the described apparatus embodiment is merely exemplary. For example, the module or the unit division is merely a logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read only memory. ROM), a random access memory (random access memory, RAM), a magnetic disk, a compact disc, or the like.

The foregoing contents are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
one or more processors;
a camera coupled to the one or more processors;
a display screen coupled to the one or more processors; and
a memory coupled to the one or more processors, wherein the memory is configured to store instructions that, when executed by the one or more processors, cause the electronic device to be configured to:
display a first interface of a camera application that comprises a first preview image and a first control;
start to record a first video and display a second interface of the camera application in response to a first operation on the first control, wherein the second interface of the camera application comprises a second preview image and a second control;
obtain a first image in response to a second operation on the second control during recording of the first video;
display a first interface of a gallery application after the recording of the first video is completed, wherein the first interface of the gallery application comprises:
a first thumbnail corresponding to the first video;
a second thumbnail corresponding to the first image; and
at least one other thumbnail corresponding to a video other than the first video or an image not associated with the first video;
acquire a second image during recording of the first video in a case that the electronic device photographs the first video in a first photographing mode;
display a second interface of the gallery application in response to a third operation on the first thumbnail, wherein the second interface of the gallery application comprises the first thumbnail and a third thumbnail of the second image, wherein the second image is an image automatically acquired from the first video; and
skip automatically acquiring an image from a second video during recording of the second video in a case that the electronic device photographs the second video in a second photographing mode,
wherein the first video and the second image have a same group identifier.

2. The electronic device of claim 1, wherein the second interface of the gallery application further comprises the first video.

3. The electronic device of claim 2, wherein in response to the third operation on the first thumbnail, the first video is played silently on the second interface of the gallery application, wherein the second interface of the gallery application further comprises a progress bar, a third control, and a fourth control, and wherein the instructions, when executed by the one or more processors, further cause the electronic device to be configured to:
pause playing the first video in response to a fourth operation on the third control;
play sound associated with the first video in response to a fifth operation on the fourth control; and
adjust a playback progress of the first video in response to a sixth operation on the progress bar.

4. The electronic device of claim 3, wherein after displaying the second interface of the gallery application in response to a third operation on the first thumbnail, the instructions, when executed by the one or more processors, further cause the electronic device to be configured to display a third interface of the gallery application in response to a seventh operation on the third thumbnail, wherein the third interface of the gallery application comprises the first thumbnail, the second image, and the third thumbnail.

5. The electronic device of claim 1, wherein the first thumbnail is larger than the third thumbnail on the second interface of the gallery application, and wherein the third thumbnail is larger than the first thumbnail on a third interface of the gallery application.

6. The electronic device of claim 1, wherein the instructions, when executed by the one or more processors, further cause the electronic device to be configured to:
display a fourth interface of the gallery application, wherein the fourth interface of the gallery application comprises a first folder;
display a fifth interface of the gallery application in response to an eighth operation on the first folder, wherein the fifth interface of the gallery application comprises the third thumbnail; and
display a sixth interface of the gallery application in response to a ninth operation on the third thumbnail, wherein after the recording of the first video is completed, the sixth interface of the gallery application automatically comprises the second image.

7. The electronic device of claim 6, wherein the sixth interface of the gallery application further comprises the first thumbnail and the third thumbnail.

8. The electronic device of claim 6, wherein the fourth interface of the gallery application further comprises a second folder, and wherein the instructions, when executed by the one or more processors, further cause the electronic device to be configured to display a seventh interface of the gallery application in response to a tenth operation on the second folder, wherein after the recording of the first video is completed, the seventh interface automatically comprises the second thumbnail.

9. The electronic device of claim 1, wherein the second interface of the camera application further comprises a fifth control, and wherein the instructions, when executed by the one or more processors, further cause the electronic device to be configured to:
end recording the first video and display the first interface of the camera application in response to an eleventh operation on the fifth control, wherein the first interface of the camera application further comprises a sixth control; and
display the second interface of the gallery application in response to a twelfth operation on the sixth control.

10. The electronic device of claim 1, wherein the instructions, when executed by the one or more processors, further cause the electronic device to be configured to:
parse the first video corresponding to the first thumbnail to obtain a group identifier corresponding to the first video before displaying the second interface of the gallery application in response to the third operation on the first thumbnail; and
search for an image having a same group identifier as the first video, and identify a found image according to the search as the second image.

11. The electronic device of claim 1, wherein file header information of the first video comprises tag information including a group identifier of the first video, and wherein an image file of the second image comprises a group identifier of the second image.

12. The electronic device of claim 11, wherein a database comprises a first field, and the first field comprises the group identifier of the first video and the group identifier of the second image.

13. The electronic device of claim 12, wherein the database comprises a second field, and wherein the second field corresponding to the first video describes a quantity of images having a same group identifier as the first video.

14. The electronic device of claim 1, wherein file header information of the first video comprises a first identifier, an image file of a third image comprises a second identifier, the first identifier is associated with the second identifier, and the second interface of the gallery application further comprises a fourth thumbnail of the third image.

15. The electronic device of claim 14, wherein the first identifier is the same as the second identifier.

16. A video processing method, comprising:
displaying a first interface of a camera application, wherein the first interface of the camera application comprises a first preview image and a first control;
starting to record a first video and displaying a second interface of the camera application in response to a first operation on the first control, wherein the second interface of the camera application comprises a second preview image and a second control;
obtaining a first image in response to a second operation on the second control during recording of the first video;
displaying a first interface of a gallery application after the recording of the first video is completed, wherein the first interface of the gallery application comprises:
a first thumbnail corresponding to the first video;
a second thumbnail corresponding to the first image; and
at least one other thumbnail corresponding to a video other than the first video or an image not associated with the first video;
acquiring a second image during recording of the first video in a case that the electronic device photographs the first video in a first photographing mode;
displaying a second interface of the gallery application in response to a third operation on the first thumbnail, wherein the second interface of the gallery application comprises the first thumbnail and a third thumbnail of the second image, wherein the second image is an image automatically acquired from the first video; and
skipping automatically acquiring an image from a second video during recording of the second video in a case that the electronic device photographs the second video in a second photographing mode.

17. The video processing method of claim 16, wherein the second interface of the gallery application further comprises the first video, the method further comprising playing the first video silently on the second interface of the gallery application in response to the third operation on the first thumbnail.

18. The video processing method of claim 17, wherein the second interface of the gallery application further comprises a progress bar, a third control, and a fourth control, the method further comprising:
pausing playing the first video in response to a fourth operation on the third control;
playing sound associated with the first video in response to a fifth operation on the fourth control; and
adjusting a playback progress of the first video in response to a sixth operation on the progress bar.

19. A non-transitory computer-readable storage medium storing instructions that, when executed by one or more processors of an electronic device, cause the electronic device to be configured to:
display a first interface of a camera application that comprises a first preview image and a first control;
start to record a first video and display a second interface of the camera application in response to a first operation on the first control, wherein the second interface of the camera application comprises a second preview image and a second control;
obtain a first image in response to a second operation on the second control during recording of the first video;
display a first interface of a gallery application after the recording of the first video is completed, wherein the first interface of the gallery application comprises:
a first thumbnail corresponding to the first video;
a second thumbnail corresponding to the first image; and
at least one other thumbnail corresponding to a video other than the first video or an image not associated with the first video;
acquire a second image during recording of the first video in a case that the electronic device photographs the first video in a first photographing mode;
display a second interface of the gallery application in response to a third operation on the first thumbnail, wherein the second interface of the gallery application comprises the first thumbnail and a third thumbnail of the second image, wherein the second image is an image automatically acquired from the first video; and skip automatically acquiring an image from a second video during recording of the second video in a case that the electronic device photographs the second video in a second photographing mode, wherein the first video and the second image have a same group identifier.

20. The non-transitory computer-readable storage medium of claim 19, wherein the second interface of the gallery application further comprises the first video.

* * * * *